(12) United States Patent
Suresh et al.

(10) Patent No.: US 6,641,893 B1
(45) Date of Patent: Nov. 4, 2003

(54) FUNCTIONALLY-GRADED MATERIALS AND THE ENGINEERING OF TRIBOLOGICAL RESISTANCE AT SURFACES

(75) Inventors: Subra Suresh, Wellesley, MA (US); Antonios E. Giannakopoulos, Somerville, MA (US); Marten Olsson, Solna (SE); Rajendran Thampuran, Singapore (SG); Ole Jorgensen, Virum (DK); Nitin P. Padture, Storrs, CT (US); Juthamas Jitcharoen, Willimantic, CT (US)

(73) Assignees: Massachusetts Institute of Technology, Cambridge, MA (US); University of Connecticut, Farmington, CT (US)

( * ) Notice: Subject to any disclaimer, the term of this patent is extended or adjusted under 35 U.S.C. 154(b) by 0 days.

(21) Appl. No.: 09/062,870

(22) Filed: Apr. 20, 1998

Related U.S. Application Data

(63) Continuation-in-part of application No. 08/885,051, filed on Jun. 30, 1997, now abandoned, and a continuation-in-part of application No. 08/818,170, filed on Mar. 14, 1997, now abandoned.
(60) Provisional application No. 60/047,158, filed on May 20, 1997.

(51) Int. Cl.[7] ................................................. B32B 5/12
(52) U.S. Cl. ................ 428/105; 428/298.1; 428/299.1; 428/300.7; 428/301.4; 428/911; 428/107; 428/109; 428/113; 428/217; 428/218
(58) Field of Search .................... 428/298.1, 299.1, 428/300.7, 301.4, 911, 105, 107, 109, 113, 217, 218

(56) References Cited

U.S. PATENT DOCUMENTS

| | | | |
|---|---|---|---|
| 1,071,430 A | 8/1913 | Keen ............................. 73/82 |
| 1,125,912 A | 1/1915 | Ringland et al. ............... 73/82 |
| 1,348,897 A | 8/1920 | Ringland ........................ 73/82 |
| 2,984,282 A | * 5/1961 | Vittorelli ..................... 152/526 |
| 3,516,468 A | * 6/1970 | Jones .......................... 152/528 |
| 3,633,520 A | * 1/1972 | Stiglich, Jr. ................. 109/49.5 |
| 3,699,185 A | 10/1972 | Dickie et al. ............... 260/836 |

(List continued on next page.)

FOREIGN PATENT DOCUMENTS

| | | |
|---|---|---|
| DE | 39 24 267 C1 | 12/1994 |

(List continued on next page.)

OTHER PUBLICATIONS

T.M. Shaw and P.R. Duncombe, "Forces between Aluminum Oxide Grains in a Silicate Melt and Their Effect on Grain Boundary Wetting," J.Am. Ceram.Soc., vol. 74, No. 10, pp. 2495–2505, 1991.

(List continued on next page.)

*Primary Examiner*—William P. Watkins, III
(74) *Attorney, Agent, or Firm*—Wolf, Greenfield & Sacks, P.C.

(57) ABSTRACT

An article is provided that is highly resistant to localized normal indentation, or indentation tensile stresses, against its surface. The article is a stacked array of at least five layer units each having local anisotropy in at least one direction. Each unit has an adjacent unit that differs in a mechanical property, or offset in principle axis of anisotropy by less than 45°. The article forms part of a construction constructed and positioned to withstand indentation, or contact damage, detrimental to its use having a component normal to any tangent of the surface. The article can be a stacked array of fiber-reinforced polymeric material, i.e., prepreg, with the fiber direction offset from each layer to the next by less than 45°. Methods of making the article and methods of use of the article to resist impact are provided. Also provided are articles having surfaces, the surfaces being constructed and arranged to withstand sliding contact stress. The surfaces of these articles are functionally-graded.

56 Claims, 27 Drawing Sheets

U.S. PATENT DOCUMENTS

| | | | |
|---|---|---|---|
| 3,743,569 A | 7/1973 | Wilkins et al. | 428/217 |
| 3,763,697 A | 10/1973 | Sturm | 73/88 R |
| 3,805,598 A | 4/1974 | Corcoran | 73/81 |
| 3,822,946 A | 7/1974 | Rynkowski | 356/160 |
| 3,856,883 A | 12/1974 | Dickie et al. | 260/836 |
| 3,877,298 A | 4/1975 | Narang | 73/81 |
| 3,879,982 A | 4/1975 | Schmidt | 73/12 |
| 3,896,869 A * | 7/1975 | Fujishima et al. | 152/527 |
| 4,012,548 A | 3/1977 | Roberti | 428/106 |
| 4,023,401 A | 5/1977 | Ernst | 73/81 |
| 4,023,801 A * | 5/1977 | VanAuken | 273/DIG. 23 |
| 4,102,221 A * | 7/1978 | Hatch | 428/113 |
| 4,104,901 A | 8/1978 | Sidaway | 73/81 |
| 4,263,956 A * | 4/1981 | Pommier | 152/454 |
| 4,275,966 A | 6/1981 | Kleesattel | 356/378 |
| 4,277,174 A | 7/1981 | Kleesattel | 356/372 |
| 4,304,123 A | 12/1981 | Aschinger et al. | 73/81 |
| 4,312,220 A | 1/1982 | Borgersen et al. | 73/81 |
| 4,312,221 A | 1/1982 | Edward et al. | 73/81 |
| 4,331,026 A | 5/1982 | Howard et al. | 73/81 |
| 4,361,034 A | 11/1982 | Borgersen et al. | 73/81 |
| 4,372,152 A | 2/1983 | Lewis et al. | 73/81 |
| 4,383,450 A | 5/1983 | Pringiers et al. | 73/790 |
| 4,416,175 A | 11/1983 | Bettner et al. | 83/29 |
| 4,463,600 A | 8/1984 | Hobbs et al. | 73/81 |
| 4,501,856 A * | 2/1985 | Harpell et al. | 264/257 |
| 4,530,235 A | 7/1985 | Shabel | 73/81 |
| 4,535,623 A | 8/1985 | Gilberto | 73/81 |
| 4,611,487 A | 9/1986 | Krenn et al. | 73/81 |
| 4,621,523 A | 11/1986 | Shabel et al. | 73/81 |
| 4,622,254 A * | 11/1986 | Nishimura et al. | 428/102 |
| 4,627,096 A | 12/1986 | Grattoni et al. | 382/8 |
| 4,653,106 A | 3/1987 | Yamatsuta et al. | 382/8 |
| 4,667,509 A | 5/1987 | Tobolski et al. | 73/83 |
| 4,671,104 A | 6/1987 | Fischer | 73/81 |
| 4,691,559 A | 9/1987 | Fischer | 73/81 |
| 4,699,000 A | 10/1987 | Lashmore et al. | 73/81 |
| 4,732,803 A * | 3/1988 | Smith, Jr. | 109/49.5 |
| 4,786,541 A * | 11/1988 | Nishimura et al. | 428/102 |
| 4,820,051 A | 4/1989 | Yanagisawa et al. | 356/378 |
| 4,820,568 A * | 4/1989 | Harpell et al. | 428/113 |
| 4,852,397 A | 8/1989 | Haggag | 73/81 |
| 4,856,326 A | 8/1989 | Tsukamoto | 73/150 A |
| 4,879,165 A * | 11/1989 | Smith | 109/49.5 |
| 4,883,700 A * | 11/1989 | Harpell et al. | 152/451 |
| 4,896,339 A | 1/1990 | Fukomoto | 377/19 |
| 4,945,490 A | 7/1990 | Biddle, Jr. et al. | 364/506 |
| 4,956,994 A | 9/1990 | Lue | 73/81 |
| 4,984,453 A | 1/1991 | Enomoto | 73/81 |
| 5,062,293 A | 11/1991 | Bakirov et al. | 73/81 |
| 5,064,439 A | 11/1991 | Chang et al. | 623/66 |
| 5,067,346 A | 11/1991 | Field | 73/81 |
| 5,096,772 A * | 3/1992 | Snyder | 152/531 |
| 5,133,210 A | 7/1992 | Lesko et al. | 73/81 |
| 5,146,779 A | 9/1992 | Sugimoto et al. | 73/81 |
| 5,150,608 A | 9/1992 | Mazzoleni et al. | 73/81 |
| 5,165,274 A | 11/1992 | Thiercelin | 73/151 |
| 5,175,040 A * | 12/1992 | Harpell et al. | 428/113 |
| 5,177,999 A | 1/1993 | Tobolski et al. | 73/82 |
| 5,192,330 A | 3/1993 | Chang et al. | 623/66 |
| 5,193,383 A | 3/1993 | Burnham et al. | 73/105 |
| 5,195,364 A | 3/1993 | Dehe et al. | 73/81 |
| 5,279,879 A * | 1/1994 | Takezawa et al. | 428/110 |
| 5,284,049 A | 2/1994 | Fukumoto | 73/82 |
| 5,306,557 A | 4/1994 | Madison | 428/304.4 |
| 5,309,754 A | 5/1994 | Ernst | 73/81 |
| 5,355,721 A | 10/1994 | Las Navas Garcia | 73/82 |
| 5,359,879 A | 11/1994 | Oliver et al. | 73/7 |
| 5,365,457 A | 11/1994 | Madigosky | 364/506 |
| 5,396,804 A | 3/1995 | Moet et al. | 73/788 |
| 5,433,215 A | 7/1995 | Athanasiou et al. | 128/774 |
| 5,437,450 A | 8/1995 | Akatsuka et al. | 273/80 B |
| 5,438,863 A | 8/1995 | Johnson | 73/54.02 |
| 5,439,627 A | 8/1995 | De Jager | 264/129 |
| 5,483,821 A | 1/1996 | Mazzoleni et al. | 73/82 |
| 5,486,924 A | 1/1996 | Lacey | 356/357 |
| 5,490,416 A | 2/1996 | Adler | 73/82 |
| 5,522,904 A | 6/1996 | Moran et al. | 623/22 |
| 5,545,475 A | 8/1996 | Korleski | 428/306.6 |
| 5,547,729 A | 8/1996 | Tingley | 428/74 |
| 5,591,233 A | 1/1997 | Kelman et al. | 623/16 |
| 5,605,868 A | 2/1997 | Chyung et al. | 501/8 |
| 5,614,061 A | 3/1997 | Van Phan et al. | 162/109 |
| 5,624,386 A | 4/1997 | Tailor et al. | 602/16 |
| 5,999,887 A | 12/1999 | Giannakopoulos et al. | |
| 6,147,018 A * | 11/2000 | Chiou | 2/2.5 |
| 6,276,255 B1 * | 8/2001 | Field et al. | 2/2.5 |
| 2001/0053645 A1 * | 12/2001 | Henderson | 442/135 |

FOREIGN PATENT DOCUMENTS

| | | |
|---|---|---|
| DE | 39 24 267 C1 | 12/1997 |
| EP | 0 497 345 A2 | 8/1992 |
| EP | 0 607 466 A1 | 7/1994 |
| GB | 1 481 698 | 8/1977 |
| GB | 2 258 536 A | 2/1993 |
| SU | 1260729 A | 9/1986 |
| SU | 1827579 A1 | 7/1993 |
| WO | WO 88/00691 A1 | 1/1988 |
| WO | WO 97/39333 A2 | 10/1997 |

OTHER PUBLICATIONS

D.R. Clarke, "On the Equilibrium Thickness of Intergranular Glass Phases in Ceramic Materials," J.Am.Ceram.Soc., vol. 70, No. 1, pp. 15–22. 1987.

JP 05310489 Nov. 22, 1993 Toshiba Tungaloy Co Ltd, Patent Abstracts of Japan and Database WPI, Section Ch, Week 9351, Derwent Publications Ltd., AN 93–410718, XP–002067506, Abstract JO5310489 931122.

Database WPI, Section Ch, Week 9109, Derwent Publications Ltd., AN 91–060975, XP–002067507, Abstract J03008785 910116.

JP 05262585 Oct. 12, 1993 Toshiba Corp., Patent Abstracts of Japan.

A. Bolshakov and G.M. Pharr, "Influences of pileup on the measurement of mechanical properties by load and depth sensing indentation techniques," J.Mater.Res., vol. 13, No. 4, pp. 1049–1058, Apr. 1998.

P.L. Flaitz & J.A. Pask, "Penetration of Polycrystalline Alumina by Glass at High Temperatures," J. Am. Ceram. Soc., vol. 70, No. 7, pp. 449–455, 1987.

C. Kawai & S. Wakamatsu, "Fabrication of C/SiC composites by an electrodeposition/sintering method and the control of the properties," Journal of Materials Science, vol. 31, pp. 2165–2170, 1996.

Abstract, University Departmental Seminar, Jorgensen, Dec. 9, 1996.

Large Spherical Indentation of Composite Laminates with Controlled Gradients in Elastic Anisotropy, Jorgensen et al; Nov., 1996, 1–37 MIT Report Nav–PGS–96–1.

S. Suresh et al., "Spherical Indentation of Compositionally Graded Materials: Theory and Experiments," Acta mater, vol. 45, No. 4, pp. 1307–1321, 1997.

A.E. Giannakopoulos and S. Suresh, "Indentation of Solids with Gradients in Elastic Properties: Part I. Point Force," Int. J. Solids Structures, vol. 34, No. 19, pp. 2357–2392, 1997.

A.E. Giannakopoulos and S. Suresh, "Indentation of Solids with Gradients in Elastic Properties: Part II. Axisymmetric Indentors," Int. J. Solids Structures, vol. 34, No. 19, pp. 2393–2428, 1997.

Robinson W. H. et al., "Stress–Strain Curve for aluminium from a continuous indentation test", *Journal of Materials Science*, vol. 12, No. 10, pp. 1961–1965. Oct. 1977.

Cook, Robert F. et al., "Indentation load–displacement behaviour during conventional hardness testing", *Journal of Hard Materials*, vol. 5, pp. 179–190, 1994.

Loubet, J.L. et al., "Vickers Indentation Curves of Magnesium Oxide (MgO)", *Journal of Tribology*, vol. 106, pp. 43–48, Jan. 1984.

Polvani R.S., et al. "A Dynamic Microindendation Apparatus for Materials Characterization", *Journal of Test Testing and Evaluation*, vol. 16, No. 1, pp. 12–16, Jan., 1988.

Database WPI, Section EI, Week 9708 Derwent Publications Ltd., AN 97–080669, JP 08 320 284 A (Shimadzu Corp. et al.), Dec. 3, 1996, abstract, figure.

S. V. Hainsworth, et al., "Analysis of nanoindentation load-–displacement loading curves", J. Mater. Res., vol. 11, No. 8, pp. 1987–1995, (Aug. 1996).

W. C. Oliver and G.M. Pharr, "An improved technique for determining hardness and elastic modulus using load and displacement sensing indentation experiments", J. Mater. Res., vol. 7, No. 6, pp. 1564–1583 (Jun. 1992).

Mortensen A. and Suresh, S. "Functionally Graded Metals and Metal–Ceramic Composites: Part 1. Processing," International Materials Reviews pp. 239–265 (9/95).

Bhushan, B and Koinkar, V. "Nanoindentation Hardness Measurements Using Atomic Force Microscopy," Appl. Phys. Lett 64(13) pp. 1653–1655 (Mar. 28, 1994).

Soderlund, E. and Rowcliffe, D. "Analysis of Penetration Curves Produced by Depth–sensing Indentation Systems," J. Hard Mater. 5, pp. 149–177 (1994).

National Institute of Standards and Technology (NIST) Special Publication 896; "Conference Proceedings: International Workshop on Instrumental Indentation", San Diego, CA, Apr. 22–23, 1995, 1–9.

J.S. Field and M.V. Swain, "Determining the mechanical properties of small volumes of material from submicrometer spherical indentations", J. Mater. Res., vol. 10, No. 1, pp. 101–112, Jan. 1995.

P.–Larson et al., "Analysis of Berkovich Indentation", Int. J. Solids Structures, vol. 33, No. 2, pp. 221–248, (1996).

R. Hill, et al., "A theoretical study of the Brinell hardness test", Proc. R. Soc. Lond., vol. A423 pp. 301–330 , (1989).

A.E. Giannakopoulos, et al., "Analysis of Vickers Indentation", Int. J. Solids Structures, vol. 31, No. 19 pp. 2679–2708, (1994).

F. Harders and S. Kienow, "Feuerfestkunde", *Springer–Verlag*, 1960, pp. 129–132 (Translation provided).

Jitcharoen, J.; Padture, N. P.; Giannakopoulos, A. E.; and Suresh, S.; "Hertzian–Crack Suppression in Ceramics with Elastic–Modulus–Graded Surfaces," *J. Am. Ceram. Soc.*, vol. 81, No. 9, pp. 2301–2308 (1998).

\* cited by examiner

50 μm

FUNCTIONALLY-GRADED MATERIALS AND THE ENGINEERING OF TRIBOLOGICAL RESISTANCE AT SURFACES

RELATED APPLICATIONS

This application is a continuation-in-part of the following U.S. patent applications: U.S. application Ser. No. 08/818,170 of Suresh, et al., entitled FUNCTIONALLY-GRADED MATERIAL AND METHOD AND APPARATUS FOR DETERMINATION OF MECHANICAL PROPERTIES OF FUNCTIONALLY-GRADED MATERIALS filed Mar. 14, 1997, now abandoned, U.S. provisional patent application serial No. 60/047,158 of Jorgensen, et al., entitled FUNCTIONALLY-GRADED COMPOSITE ARTICLE filed May 20, 1997, now abandoned, and U.S. application Ser. No. 08/885,051 of Jorgensen, et al., entitled FUNCTIONALLY-GRADED COMPOSITE ARTICLE filed Jun. 30, 1997, now abandoned.

FEDERALLY SPONSORED RESEARCH

This invention was made with government support under Grant No. N00014-93-1-1277 awarded by the Department of the Navy and Grant No. DMR-9632570 awarded by the National Science Foundation. The government has certain rights in the invention.

FIELD OF THE INVENTION

The present invention relates generally to functionally-graded materials and more particularly to composite laminates and other constructions, in which each layer differs in a principle axis of anisotropy of less than 45° relative to its preceding layer, the construction exhibiting improved resistance to failure under indentation perpendicular to the layer arrangement, and functionally-graded articles designed to withstand sliding contact stress.

BACKGROUND OF THE INVENTION

Layered structures define a wide variety of construction arrangements, including lightweight laminated composite articles. Laminated composites typically are defined by a continuous, essentially planar array of continuous fibers embedded in a matrix defining a lamina or ply, a plurality of plies forming a laminate composite. These composite articles can be arranged to meet various in-plane stiffness or strength requirements by appropriate stacking of similar orthotropic plies of dissimilar orientation. Arrangements of this type have been analyzed in terms of their ability to provide strength in a direction in alignment with the planes of the construction.

U.S. Pat. No. 5,064,439 (Chang) describes a load-bearing orthopedic prosthetic device for human implantation, such as a hip stem prosthesis, made of layered plies each including parallel-oriented continuous filament fibers. The arrangement is such that load is born primarily in the direction of the planes of the plies. The plies are arranged such that at or near the surfaces of the devices, plies are oriented with fibers running longitudinally. That is, at or near the surfaces of the devices fibers are oriented in the longitudinal direction of the bone replaced by the prosthesis—the primary direction of load. The plies are stacked with fibers offset at 5°–40° from the longitudinal axis between the surface layers. Chang tests failure load properties of a wide variety of balanced and unbalanced stacked arrays, noting that completely unbalanced fiber orientations should not be used because of substantially lower strengths that purportedly result. Optimal fiber orientations, according to Chang, include $[O_2/\pm 7.5/\pm 15/\pm 22.5/\pm 30]_s$; $[O_2/(\pm 20)_4]_s$; and $[O_2/\pm 20/\pm 30/\pm 20/\pm 30]_s$, where fiber orientations are given in degrees and ordered from an exterior surface for each layer into the middle plane, and are symmetric about the middle plane, with "±" indicating one layer at a positive angle and one at a negative angle. Table III of Chang lists other fiber orientations tested, both balanced and unbalanced.

U.S. Pat. No. 5,591,233 (Kelman) describes a metal/composite hybrid orthopedic implant such as a hip prosthesis. The composite portion is comprised of filaments non-linearly disposed to produce a structure of variable modulus along its length.

U.S. Pat. Nos. 5,624,386 (Tailor) and U.S. Pat. No. 5,522,904 (Moran) also describe composite laminate articles for orthopedic braces and implants, respectively, including multiple fiber layers oriented in at least two directions.

U.S. Pat. No. 5,437,450 (Akatsuka) describes a golf club shaft composed of an inner tubular layer of a carbon fiber-reinforced plastic having a fiber orientation angle of 40–50° with respect to the longitudinal axis of the shaft, and an outer tubular layer of carbon fiber reinforced plastic provided around the inner layer and having a fiber orientation angle of 5–30°. The resultant shaft purportedly is lightweight but exhibits high mechanical strengths suitable for use with a large metal golf club head.

In the field of biomedical implants, mechanical machinery and related fields, there are many situations in which one particular device is designed to repeatedly engage in sliding contact with another device. For example, in the case of biomedical implants such as hip, knee, shoulder, and finger joint protheses, pins, screws, and dental implants, and mechanical components such as gears and ball bearings, the resistance of the article to sliding wear is critical to the success for long-term use. One approach to producing wear-resistant articles designed to withstand sliding contact has been to employ graded materials. The use of graded materials has, in some cases, led to better stress distribution from a prosthetic implant to an attached or adjacent bone (J. B. Park, Biomaterials: An Introduction, New York, Plenum Press). That is, it is known that the modulus of a prosthetic implant, at a surface that is designed to engage bone, should match as closely as possible the modulus of the bone, and the use of graded materials has in some cases allowed such matching.

Several of the above and other documents represent composite, fibrous laminate articles including plies that are offset with respect to fiber direction to affect certain strength and stiffness requirements. However, study and development of layered articles tailored to provide optimal impact resistance in a direction perpendicular to the plane of the stacked array are inadequate. Loads applied perpendicular to the plane of stacked arrays can cause stress concentrations at interfaces between ply groups of dissimilar anisotropic orientation. Spherical indentation studies of cross-ply laminates show that stress concentrations initiate transverse cracks, delamination, and/or splitting of fibers which lowers the indentation strength and can result in eventual failure of the structure.

Additionally, techniques for improving the wear resistance of articles designed to withstand sliding contact are known. However, the problem of wear of such components has severely limited the success of long-term implantation of many medical prosthesis. This has led to patient discomfort and higher medical costs. The exacting demands on traditional and high-technology devices of this sort require new, better wear-resistant composites.

Accordingly, it is an object of the present invention to provide layered constructions that exhibit improved structural resistance to indentation or impact in a direction perpendicular to the planar orientation of the structure. It is yet another object to provide better wear-resistant articles constructed to withstand sliding contact.

SUMMARY OF THE INVENTION

According to one aspect of the invention a series of constructions are provided, which can be articles. In one embodiment, the construction is defined by a man-made, functionally-graded material having Young's modulus that increases as a function of depth from the surface of the material. The construction exhibits Young's modulus at the surface of at least about 1 GPa. According to another embodiment the construction is a man-made functionally-graded material having Young's modulus that increases as a function of depth from the surface, wherein the construction has a Poisson ratio of at least about 0.2.

In another embodiment a construction is provided that is a man-made, functionally-graded material having Young's modulus that increases as a function of depth from the surface at a rate that decreases.

Another aspect of the invention involves a method of making a material. The method involves providing a first material and a second material, and allowing the second material in a fluid state to infiltrate voids at a surface and into the first material under conditions and for a period of time sufficient to create a composite article. The composite article is graded in content from relatively lower first material content at the surface to complete first material content within the functionally-graded article.

In another aspect the invention provides an article for resisting indentation against its surface. The article includes a stacked array of at least five layer units each having a principle axis of anisotropy. Each unit has an adjacent unit, and the principle axis of anisotropy of each unit is offset from that of a unit to which it is adjacent by less than 45°. The article forms part of a construction constructed and positioned to withstand indentation having a component normal to a tangent of the surface of the stacked array.

In another embodiment the invention provides an article, having a surface, that is made of at least five layer units each having x, y, and z axes. The layer units have, individually, prior to assembly, x-axis mechanical properties, y-axis mechanical properties, and z-axis mechanical properties that are essentially identical to each other. That is, the x-axis mechanical properties of each layer are identical to the x-axis mechanical properties of each adjacent layer. The layer units form a stacked array, having a surface, that has Young's modulus that increases as a function of depth from the surface. The article forms part of a construction constructed and positioned to withstand contact damage having a component normal to a tangent of the surface.

In another embodiment the invention provides an article for resisting contact damage or indentation against its surface. The article is a stacked array of at least five layer units. Each layer unit is isotropic overall in layer directions and has local anisotropy in at least one direction. Each unit has an adjacent unit that differs in a mechanical property, and the article forms part of a construction constructed and positioned to a stand indentation having a component normal to a tangent of the surface of the stacked array.

According to another aspect the invention provides methods. One method involves forming an article having a surface constructed and positioned to withstand indentation having a component normal to a tangent of the surface and having increased stiffness. The article is formed by arranging an array of at least five layer units, each having a principle axis of anisotropy that differs from that of an adjacent unit by less than 45°.

In another embodiment, the invention provides a method involving subjecting a stacked array of at least five layer units, having a surface, to indentation having a component normal to a tangent of the surface of at least ⅕ the tangential force tolerable without failure of the construction. The stacked array is an array of at least five layer units each having anisotropy in at least one direction. Each unit has an adjacent unit that differs in a mechanical property or offset in principle axis of anisotropy by less than 45°.

In another aspect the invention provides an article having a surface where the surface is constructed and arranged to be positioned to withstand a sliding contact stress. In this aspect the surface also is constructed to be a functionally-graded material during use.

Other advantages, novel features, and objects of the invention will become apparent from the following detailed description of the invention when considered in conjunction with the accompanying drawings, which are schematic and which are not intended to be drawn to scale. In the figures, each identical or nearly identical component that is illustrated in various figures is represented by a single numeral. For purposes of clarity, not every component is labeled in every figure, nor is every component of each embodiment of the invention shown where illustration is not necessary to allow those of ordinary skill in the art to understand the invention.

DETAILED DESCRIPTION OF THE INVENTION

Figure 1:
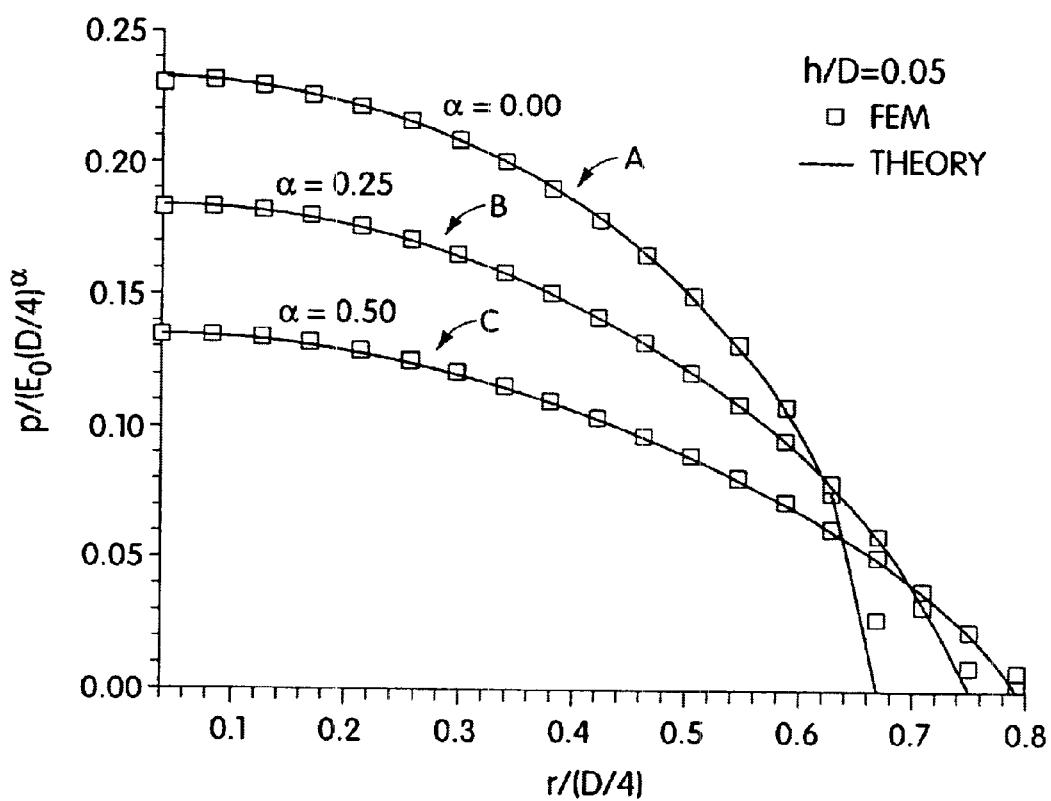
FIG. 1 is a representation of numerical treatment of spherical indentation of a material in which E increases as a function of depth according to the power law.

The following articles and patent applications are incorporated herein by reference: Giannakopoulos, et al., "Indentation of Solids with Gradients in Elastic Properties, Part I: Point Force, Part II: Axisymmetric Indenters", *International Journal of Solids and Structures*, Vol 34, pp. 2357–2428 (1997); Suresh, et al., "Spherical Indentation of Compositionally-Graded Materials: Theory and Experiments" *Acta Materialia*, Vol 45, pp. 1307–1321 (1997) U.S. patent application Ser. No. 08/632,665 of Suresh, et al., filed Apr. 15, 1996 now U.S. Pat. No. 6,134,954 and entitled DEPTH SENSING INDENTATION MECHANISM AND METHODOLOGY FOR MECHANICAL PROPERTY MEASUREMENTS; U.S. patent application Ser. No. 08/805,624 of Giannakopoulos, et al., filed Feb. 26, 1997 now U.S. Pat. No. 5,999,887 and entitled METHOD AND APPARATUS FOR DETERMINATION OF MECHANICAL PROPERTIES OF FUNCTIONALLY-GRADED MATERIALS, U.S. patent application Ser. No. 08/818,170 of Suresh, et al., filed Mar. 14, 1997 now abandoned and entitled FUNCTIONALLY-GRADED MATERIAL AND METHOD AND APPARATUS FOR DETERMINATION OF MECHANICAL PROPERTIES OF FUNCTIONALLY-GRADED MATERIALS,; and U.S. patent application Ser. No. 08/885,051 of Suresh, et al., filed Jun. 30, 1997 now abandoned and entitled FUNCTIONALLY-GRADED COMPOSITE ARTICLE.

The following explanation of nomenclature will aid in understanding the invention.

| | |
|---|---|
| a: | contact radius |
| A: | contact area of an indentor |
| c: | volume fraction of the constituent phase of the graded layer |
| D: | diameter of a spherical indentor |
| $E_{surf}$: | Young's modulus of the indented surface |
| $E_{subs}$: | Young's modulus of the homogeneous substrate |
| Eo: | Young's modulus of sample at reference depth, e.g., z = 0 for exponential model and z = 1 for power law model. |
| $E_{ind}$: | Young's modulus of the indentor |
| $E_{spec}$: | corrected specimen's reference modulus |
| K: | combined effective Young's modulus (indentor and sample) |
| h: | measured depth of an indentor relative to the surface of a sample (penetration; displacement) |
| P: | load applied to sample via an indentor |
| X: | distance between the displacement sensor and the axis of an indentor |
| z: | depth coordinate |
| $v_o$: | Poisson ratio of sample |
| $v_{ind}$: | Poisson ratio of the indentor |
| $v_{spec}$: | corrected specimen's Poisson ratio |
| $h_{tot}$: | total indentation depth that includes indentor/anvil compliance |
| $C_{ind}$: | compliance between indentor and anvil |
| α: | variation coefficient |
| P': | load predictor |
| Δα: | increment of α |
| $\frac{dp}{dh}\|1, \frac{dp}{dh}\|2$: | slopes of the P – H curve at points 1, 2, respectively |
| $a_1, a_2$: | contact radii at two loading points 1, 2, respectively |
| b: | parameter of the power law model |
| ψ: | parameter of the exponential law model |
| 2γ: | angle of the conical indentor |
| Γ: | gamma special function |
| C: | indentation compliance of the material |

One aspect of the invention involves the recognition, through theoretical and experimental analysis, that the modification of the elastic modulus (E) of a material at and near its surface can diffuse indentation tensile stresses away from the surface and into the interior of the material, and that this can be achieved where E at the surface is significantly lower than that of the bulk of the material and where E increases continuously with depth into the material until it reaches the bulk value. Such a material is referred to herein as a Surface Functionally Graded Material (S-FGM). The invention involves the discovery that Hertzian tensile stresses in S-FGMs, when away from the surface, are relatively benign and are not sufficient to initiate cone cracks. In this way, Hertzian cone cracks in brittle materials can be prevented. "Indentation tensile stresses", diffused according to this aspect of the invention, is meant to include impact events such as a projectile striking a surface, a heavy object falling onto a surface, aircraft landing on a runway, and the like. This definition encompasses road and runway foundations, bulletproof glass, armor, casings for tools that typically are dropped or struck by objects, and the like. Indention tensile stresses also defines impact events that do not necessarily involve one object striking another, but involve impact through one object in contact with another object, for example the impact on a foundation of a building built on that foundation resulting from impact events within the building, vibration, and the like.

The theory according to this aspect of the invention will now be developed in connection with six specific indentation situations. Many or all indentation events that occur, such as a projectile striking a piece of armor, can be categorized according to one of these theoretical models. The theoretical models applied to any indentor/material interaction so long as the indentor is axisymmetric.

The first indentation situation investigated involves a rigid circular punch indentor and a material in which E changes as a function of depth according to the power law ($E=E_0 z^\alpha$). In this situation, the contact pressure distribution decreases with the Poisson ratio for a set indentation depth. The only characteristic length of the problem is the radius of contact (a) taking into account the actual relation and integrating for the total applied force (P)

$$p(r) = \frac{P(1+\alpha)}{2\pi a^2}\left(1 - \frac{r^2}{a^2}\right)^{\frac{\alpha-1}{2}}. \tag{1}$$

Where r is radial distribution, and p(r) is the pressure as a function of radial distance. Of course, this model can be adjusted for other than a rigid, circular flat punch. For example, the model can be adjusted to be applicable to a flat square punch, etc.

Second, a model is created for a rigid, circular, flat punch and a material in which E changes as a function of depth exponentially ($E=E_0 e^{\alpha z}$). The pressure distribution, p(r), ($0 \leq r \leq a$), is related to the load as $$p(r) = \frac{P}{2\pi a^2}\left(1 - \frac{r^2}{a^2}\right)^{-\frac{1}{2}}\left\{1 + \frac{403.05}{\pi}\alpha^{*3}\left(\frac{4}{3} - 2\frac{r^2}{a^2}\right)\right\} \tag{2}$$

Third, a model is presented involving spherical indentation of a material in which E increases as a function of depth according to the power law. The result for the contact pressure distribution can be readily obtained as $$p(r) = \frac{(3+\alpha)P}{2\pi a^2}\left\{1 - \frac{r^2}{a^2}\right\}^{\frac{1+\alpha}{2}}. \tag{3}$$

The maximum contact pressure occurs at r=0

$$p_{max} = p(0) = \frac{(3+\alpha)P}{2\pi a^2}. \tag{4}$$

The minimum contact pressure occurs at r=a and $p_{min}=p(a)=0$.

The depth-contact radius (h–a) relation for the spherical indentation of an elastic medium with a power-law variation of Young's modulus, reduces from Eq. 5

$$h = \frac{a^2}{D}\frac{2}{\alpha+1}. \tag{5}$$

Where D is the diameter of the sphere. Fourth, a model is presented for a material in which E changes as a function of depth exponentially, in connection with spherical indentation. The pressure distribution, p(r) ($0 \leq r \leq a$), is $$p(r) \approx \frac{3P}{2\pi a^2}\left(1 - \frac{r^2}{a^2}\right)^{\frac{1}{2}}, \tag{6}$$

which is the same as for the homogeneous case ($\alpha$=0). The force-depth (P–h) relation is $$h \approx \frac{P}{2\pi a E_0}\left\{\frac{\pi}{2} - \alpha^*\left(3.7 - \frac{403.05}{3}\alpha^{*2} + \frac{2}{45\pi}403.05^2\alpha^{*5}\right)\right\} + \tag{7}$$

$$+\frac{2}{3}\frac{a^2}{D}\left(1 - \frac{4}{15}403.05\alpha^{*3}\right). \tag{8}$$

The force-contact radius (P–a) relation is given by $$a^3 \approx \frac{3\pi P}{E_0}\left(\frac{8\pi}{D} + \frac{P}{E_0}403.05a^3\right)^{-1}. \tag{9}$$

Clearly, eqs. (7), (8) and (9) show a "size" effect in the form of decreasing stiffness with load, leading to a sigmoidal force-depth response for $\alpha<0$ (completely below the homogeneous response) and an almost vertical (rigidly stiff) force-depth response for $\alpha>0$ (completely above the homogeneous response).

Fifth, a model is presented for a conical indentor (for conical angle of $2\gamma$) and a material in which E changes as a function of depth according to the power law. The pressure distribution is obtained from Eq. (10), for the conical case to be $$p(r) = \frac{P(1+\alpha)(2+\alpha)}{2\pi a^2}\int_{r/a}^{1}\left(t^2 - \frac{r^2}{a^2}\right)^{\frac{\alpha-1}{2}}dt. \tag{10}$$

For the homogeneous case, $\alpha$=0, Eq. (10) reduces to the well known solution of Love (1939), $$p(r) = \frac{P}{\pi a^2}\left\{-1n(ar) + 1n\left[a^2 + a^2\left(\sqrt{1-(r/a)^2}\right)\right]\right\} = \tag{11}$$

$$\frac{E_0 \cot\gamma}{2(1-\nu^2)}\operatorname{arccosh}(a/r),$$

which exhibits a logarithmic singularity at r=0. For $\alpha \neq 0$, the contact stresses have no singularity at r=0 or at any other point of the surface. In fact, the finite value at r=0 is the maximum contact pressure and is given by $$p_{max} = p(0) = \frac{P(1+\alpha)(2+\alpha)}{2\pi a^2 \alpha}. \quad (12)$$

Note that $p_{max} \to \infty$ for $\alpha \to 0$. The lowest value $p_{max}$ (=3P/($\pi a^2$)) appears for $\alpha \to 1$. The minimum contact pressure appears at r=a and $p_{min}$=p(a)=0.

The depth-contact radius (h–a) relation reads as h=a$\pi$/2 tan $\gamma$. The contact radius, a, connects with the load, P.

We note the "size" effect in the average pressure-depth relation, of the order $h^\alpha$, which indicates that the average pressure (or hardness) increases with indentation depth. This is to be expected on the physical ground that a higher load affects a larger material volume beneath the surface which is stiffer than the surface material; this causes and overall stiffer contact behavior. In the homogeneous case, the average pressure-depth variation is constant, a fact a that is used in hardness estimation as the average contact stress. Hence, elastic inhomogeneity at the surface may contribute to the experimentally observed "size" effect of sharp indentation tests.

For the homogeneous case, $\alpha=0$, we retrieve Love's results.

Sixth, a model is presented involving a conical indentor and a material in which E increases as a function of depth exponentially.

For a conical indentor of semi-apical angle $\gamma(z_1=r\cot\gamma)$, the force-contact radius relation reads (exponentially changing elastic modulus)

$$P = 2\pi a\left(f_0 + \frac{4}{3\pi}403.05 f_1 \alpha^{*3}\right)\psi^{-1}, \quad (13)$$

where $$f_0 = E_0\left(h - \frac{\pi}{4}a\cot\gamma\right), f_1 = E_0\frac{\pi}{16}a\cot\gamma, \quad (14)$$

and $\psi$ as defined before. The total force, P, is related to the contact area, a, as $$P = \frac{\pi E_0 a^2}{2\left(1 - \frac{2(403.05)}{3\pi}\alpha^{*3}\right)\tan\gamma}. \quad (15)$$

Using the geometric relation, h=a$\pi$/(2tan $\gamma$), which connects the contact radius, a, with the indentation depth, h, we can express (15) as a force-depth (P–h) relation. Clearly, the "size" effect appears since the force, P, is not a parabolic function of the depth. In all cases, at low values of h, the results are close to the homogeneous case. At high loads, a sigmoidal response appears for $\alpha$<0, completely below the homogeneous response and a concave response for $\alpha$>0, completely above the homogeneous case. In addition, it can be verified that the logarithmic singularity of the contact pressure distribution appears at the cone-tip (r=0), as in the homogeneous case, Eq. (11).

Note that for the homogeneous case, $\alpha$=0 ($\alpha$·=0), we recover exactly the classical solutions for the circular punch, as well as for the spherical and the conical indentors (Harding and Sneddon, 1945).

The above finite element analysis verifies that for the power law model, a decrease in Hertzian stress at the surface of S-FGM materials is realized.

The foregoing analytical results provide closed-form solutions for the contact pressure distribution and surface displacements in the graded elastic medium loaded normally by an axisymmetric indentor. We have checked these predictions with detailed finite element analyses. These computations provided additional information on the stress fields in the interior of the elastic solid. The numerical analysis was also capable of providing the effect of variation in v as a function of z.

The rigid indentors were loaded by displacement control, as is the case for indentation tests. A total of about 24 elements were allowed to come in contact in order to provide sufficient resolution in the computation of the fields around the indentors. The outer boundaries were taken to be at least 50 times the contact radius, to ensure semi-infinite conditions. In the present case, a rigid cylindrical punch of radius a (unit length) was pressed by a displacement of order h/a=0.005 which was the same in order to make comparisons with the homogeneous case.

The power law case: $E=E_0 z^\alpha$:

A wide range of the parameter $\alpha$($\alpha$=0.25, 0.5, 0.75, 1.0) has been modeled. Several different values of Poisson ratio, v, below and above the value, $v_{cr}=1/(\alpha+2)$, were analyzed. For a particular choice of h/a, the results are universal, if all lengths are normalized by the punch radius a, and the stresses by $E_0$. For each value of v and $\alpha$, the normalized stress fields are completely determined in the normalized plane (z/a, r/a) by the contours of constant in-plane normalized stresses $\sigma_{rr}/E_0$, $\sigma_{zz}/E_0$ and $\sigma_{rz}/E_0$, and the circumferential stress $\sigma_{\theta\theta}/E_0$. It was provided that the Poisson ratio has a rather weak effect for the stress fields in the vicinity of the punch, because the singularity at the punch perimeter dominates the solution. Overall, higher Poisson ratios (v$\to$0.5) resulted in a stiffer response, exactly as expected from the analysis. The computer values of the total force, P, and the contact pressure at the origin, p(r=0), were within 99% of the values predicted by theory. Of course, the singularity at the punch perimeter was not captured, since no special singular element was used. However, at a distance of one to two elements away from the contact perimeter, the computer solution was remarkably close to the theory.

For the same normalized indentation depth, h/a, less sinking-in develops for the power law case than for the homogeneous case, as expected from the analysis. The singularity at the contact perimeter is not as strong as for the homogeneous case, also expected from the analysis. The stress fields focus more in the interior, indicating that possible plasticity or damage is expected to concentrate mainly in the interior rather that at the surface. The main results and comparisons for the flat punch on the material with power law elastic modulus distribution were summarized. In all cases, the fields far away from the indented region conform to the point load solutions, further confirming the validity of the present analysis and the robustness of the finite element methodology used in the context of the contact theory of graded materials.

The exponential law case: $E=E_0 e^{\alpha z}$:

The exponential model was examined for a variety of positive and negative values of $\alpha$·=a$\alpha$, with Poisson ratios, v=0 and 0.3. The analytical results for the total force P and the contact pressure p(r=0) were less than 6% higher for $|\alpha\cdot| \leq 0.1$ when compared to the finite element results. They deviated more for increasing values of $|\alpha\cdot|$. This is expected, since the analytical results were obtained based on a two-term expansions around the value $\alpha$·=0. Nevertheless, all conclusions were qualitatively verified, but with the numerical values slightly higher than those predicted by the theoretical analysis.

Turning to the field variables, we examined three representative cases for $a\alpha=-0.2$, for $a\alpha=-1.5$ (partial contact) and for $a\alpha=0.2$. We observed that the amount of sinking-in of the surface is smaller for $\alpha>0$ and large (extending well outside the contact regime) for $\alpha<0$, compared to the homogeneous case ($\alpha=0$). The stress fields in the vicinity of the contact area appear quite similar in shape with the homogeneous case, with the exception of the case of partial contact. However, the stress magnitudes are much stronger for $\alpha>0$ and weaker for $\alpha<0$. This is expected, since the stresses have a square-root singularity which dominates the fields in the vicinity of the contact area. The comparisons of the overall response of the exponential case with the homogeneous case were summarized. In all cases, the fields far away from the indented region converged to the point load solutions, further confirming the validity of the present analysis and the robustness of the finite elements used for the indentation of graded materials. Obviously, other types of rigid or elastic indentors, as well as other elastic gradations of elastic properties, could be easily analyzed with the present finite element formulation.

The above theoretical treatment of a variety of indentor/sample combinations indicates that, where E of a material increases as a function of depth away from the surface, stresses that can lead to cracking in the material are dissipated. The phenomenon can be visualized with respect to FIG. 1 plotting, numerically, treatment of the theory above involving spherical indentation of a material in which E increases as a function of depth according to the power law. FIG. 1 is a plot of normalized pressure of contact as a function of normalized radius of indentation for three different materials: one in which $\alpha=0$ (curve A), one in which $\alpha=0.25$ (curve B), and one in which $\alpha=0.50$ (curve C). As $\alpha$ increases, normalized radius of indentation increases, releasing localized stress at the surface of the material.

The invention, according to one aspect, embraces a variety of materials that can be constructed to be resistant to impact via E increasing as a function of depth. In one set of embodiments, E increases as a function of depth at a decreasing rate. E can increase as a function of depth according to the power law or proportional to the power law, or according to the exponential equation or proportional to the exponential equation, both discussed above, or can increase as a function of depth approximately according to those equations, differing from those equations by no more than about 5%, more preferably no more than about 10%, more preferably still no more than about 20%. In one set of embodiments, E increases as a function of depth according to a relationship where z is greater than a (z>a), and in many cases z will be much greater than a. Preferably, in this embodiment, z is at least twice a, more preferably z is at least 4 times a, and more preferably still z is at least 6 times a in this situation, and E approaches the power law relationship ($E \rightarrow E_0 z^\alpha$), with the condition that $n>1/(2+a)$ under natural conditions, or under ambient conditions. "Under natural conditions" means conditions in which an article or construction exists in its intended environment under typical environmental conditions. For example, for a road or runway, "natural conditions" are those conditions of average annual temperature and humidity, in the absence of rain or other precipitation where precipitation occurs less than 50% of the time (i.e., in essentially all situations "natural conditions" means in the absence of precipitation). "Natural conditions" for an underwater bridge support would be defined by constant exposure to underwater conditions. "Ambient conditions" means conditions of dry air, typically conditions of Standard Temperature and Pressure, i.e. approximately 24° C. and atmospheric pressure of dry air.

For example, soil can be arranged in this way (for example, a combination of different kinds of soil gradations in sand and/or gradations in gravel). This can be accomplished, in road grading, for example, by loading a road grader with stratified sand and/or gravel such that a desired gradation in soil is applied to a road foundation, runway foundation, etc. Another example is in steel reinforcement where a vertical gradation in steel beams or rods in building reinforcements, retaining walls, and other supports can be constructed in accordance with the invention such that E increases as a function of depth. Other materials that can be similarly constructed include concrete, armor (for example metal alloys, bullet-proof glass, etc.), metal/ceramic combinations fabricated, for example, via infiltration or via controlling voids in ceramic and filling the voids with metal, spray-coated materials in which the content of the spray is changed as the thickness of the coating is increased, materials fabricated via chemical vapor deposition in which the vaporized precursor is changed as a function of deposition, stacked (layered) materials, etc. Typically, an article will be prepared from at least two components, or prepared from a single component that can exist in at least two phases or two different states. For example, a material that can be arranged as a crystalline or amorphous material can be processed controllably, for example, via controlled thermal processing, to have a gradient of crystallinity. An inorganic substance that can pack according to hexagonal or tetragonal packing, where the type of packing can be controlled by controlling packing conditions, can be useful where the various types of packing have different E. Preferably, a S-FGM material will be created in which different material components or phases are provided in which one component or phase has E of at least twice another component or phase, preferably at least five times, and more preferably still at least ten times.

One aspect of the invention involves a novel method of making a functionally-graded material that exhibits increasing Young's modulus in a direction from the surface into the interior of the material. The method involves providing a first material and a second material and creating a fluid of the first material and allowing the fluid to infiltrate the second material under conditions and for a period of time sufficient to create surface functional gradation in Young's modulus. The first material, according to preferred embodiments, is a ceramic and is exemplified by oxides, carbides, silicides, borides, nitrides, and the like, and the ceramic is softened by heating to the extent that infiltration of the second material into grain boundaries of the ceramic can occur. The second material preferably is a glass and can be any of a variety of glasses. "Glasses" encompasses, according to one set of embodiments, traditional glasses. According to another set of embodiments, it encompasses materials that can be flowed in a non-crystalline state such as metal oxides, formed by melting metals.

Selection of the first and second materials, typically the ceramic and glass, should be made according to the following criteria. The two materials should be compatible under infiltration conditions (typically heat, described below). By "compatible" it is meant that no adverse reactions are induced in either material by the other, and that the second material can infiltrate voids in the first material. Infiltration will not occur readily in some situations, due to energy considerations. For the technique to be most effective, the first material and second material, when existing as two distinct phases should have a higher energy than the first material and second material when the first material has infiltrated voids or grain boundaries in the first material.

Those of ordinary skill in the art, on the basis of the teachings herein and with reference to the teachings of others such as Clarke, "On the Equilibrium Thickness of Intergranular Glass Phases in Ceramic Materials" *J. Am. Ceram. Soc.* 70, 1, 15–22 (1987), can select suitable combinations of first and second materials. Traditional glasses, as is known, can be made with almost any combination of elements such as oxides, carbides, nitrides, and the like. Infiltration conditions, that is, those conditions under which the second material can be made to flow and to fill voids at the surface of the first material and thereby to infiltrate the first material (the voids being formed, in some cases, by the infiltration event itself) can be selected by those of ordinary skill in the art with reference to known softening, melting, and degradation temperatures of various materials. Infiltration conditions, and the infiltrated and infiltrating materials themselves, should be selected in conjunction with each other such that neither material degrades under the infiltration conditions to the extent that its properties are destroyed, and typically the conditions of temperature are selected such that the second material readily flows and the first material does not flow but is softened to the extent that infiltration can occur. Ceramics such as silicon nitride typically soften at around 1700–1900° C. Other ceramics typically soften at lower temperatures, as is known. The time required for infiltration can be estimated by those of ordinary skill in the art or can be determined in a screening test, as discussed below. Reference can be made to the following documents for guidance in selection of infiltration conditions: Flaitz, et al., "Penetration of Polycrystalline Alumina by Glass at High Temperatures", *J. Am. Ceram. Soc.*, 70, 7, 449–455 (1987); Shaw, et al., "Forces Between Aluminum Oxide Grains in a Silicate Melt and Their Effect on Grain Boundary Wetting", *J. Am. Ceram. Soc.*, 74, 10, 2495–2505 (1991).

A relatively simple screening test can be used to select combinations of the first, infiltrated material and the second, infiltrating material, and infiltration conditions. In the test, a very small, very thin film of the first material is provided, a small amount of the second material is provided on top of the first material, the temperature of this system is increased, and the bottom surface of the first material is monitored for a change in curvature. When infiltration occurs at the top surface of the material, expansion of the top surface of the material occurs without expansion of the bottom surface of the material due to the infiltration for example expansion of boundaries between grains. This causes the bottom surface of the film of the first material to assume a concave configuration, which can be monitored via known apparatus. Typically, a change in curvature is monitored optically, for example via detection of a change in reflected angle of a laser beam incident on the bottom surface. Once a change in curvature that corresponds to a predictive change based upon a desired degree of infiltration is achieved, the material can be examined to determine the degree of infiltration, and optionally the material's physical/mechanical characteristics (via indentation testing or the like) and the infiltration conditions noted.

According to this method a functionally-graded material is created in which, at a surface of the material (the surface of infiltration according to that embodiment) Young's modulus increases as a function of depth into the material. The depth, into the material, through which the gradation exists typically is less than about 1 cm for the infiltration system, preferably less than about 5 mm, more preferably less than about 3 mm, more preferably still about 2 mm or less. In accordance with any of these preferred depths of gradation, the material can extend, in a depth direction, at least twice the gradation distance, more preferably at least four times the gradation distance, more preferably at least ten times the gradation distance. For example, in armor or bullet proof glass, the armor or glass will be relatively thick but the surface gradation layer which protects the material from cracking is relatively thin.

Other techniques for creating functionally-graded materials include carborizing, ion-implantation, nitriding irradiation, cross-linking, or modification of molecular weight or crystallinity as a function of depth into a surface.

The present invention, in another aspect, involves the surprising discovery that articles having surfaces functionally-graded as described herein (as above, or as below with layer units) are better able to withstand tribological contact (sliding contact) at those surfaces, while resisting wear, better than other materials. As used herein, "tribological contact" or "sliding contact" defines an interaction between two articles in which a surface of a first article contacts and slides against a surface of a second article. Those of ordinary skill in the art generally would have expected that an article having a surface functionally graded in terms of Young's modulus as described herein would be less able to withstand stress associated with sliding contact than a similar article including a non-functionally-graded surface. Surprisingly, it has been discovered that a controlled gradient in elastic modulus in a solid improves the sliding wear performance compared to a homogeneous form of the solid. That is, an article of a particular material having a non-graded surface is less able to withstand sliding contact stress than is an article of the same material that has a surface functionally-graded as described herein, for example via infiltration of an auxiliary material.

A discussion of the operation of this surprising wear resistance follows. When a perfectly elastic solid slides against a rider (a surface of an elastic material experiences sliding contact against a surface of a second article), the material deforms elastically as the asperities (surface roughness; deformities) of one surface move over the other surface. Contact stresses arising from interfacial tractions can be idealized by indentors having various curvatures. In some sliding situations or in abrasion, asperity geometry (indentor shape) can be approximated as being spherical or cylindrical (for a concise explanation of the contact mechanics issues in tribology, see N. P. Suh, Tribophysics, Prentice-Hall, 1986, chapter 4). In most tribological situations, materials are subjected to tractions that occur in the normal and tangential directions. The stress magnitude and distribution at and below the surface determine the wear resistance of the material. It is known that surface or subsurface tensile stresses are mainly responsible for the deformation and fracture of materials subjected to sliding indentation. A general class of contact problems involving the stress distribution in elastic solids due to interfacial loading can be analyzed by the 2-D (plane strain) assumption. In this case, a uniform load is applied to an infinitely long cylindrical indentor akin to a tangential load imposed on a rigid knife edge pressed on a plane surface. In a more specific case, as in 3-body rolling (where a particle is trapped between two abrading surfaces), the tribological situation can be idealized by assuming a spherical indentor sliding on a plane surface.

The present invention finds that for any class of materials, the grading scheme shown in equation 17 will improve the sliding wear performance.

$$E = E_1 + E_0 z^\alpha \qquad \text{Eq. 17}$$

$0 \leq \alpha \leq 1$, where E, $E_1$ and $E_0$=Young's modulus, z=depth/thickness of the material. Graded alumina-glass described herein is a composite designed with the grading scheme shown in equation 17 specifically to illustrate the benefits of grading the elastic modulus. Any class of materials, subjected to loading within the elastic regime, with a controlled gradient in elastic modulus will have the propensity to lower surface and subsurface tensile stresses thereby suppressing cracking compared to its homogenous form.

This aspect of the invention, functionally-graded material constructed to withstand sliding contact stress, has implication in a variety of fields. Specifically, the invention embraces articles having surfaces constructed and arranged to be positioned to withstand sliding contact stress, defined as articles that are constructed such that, during normal use, a surface of the article experiences sliding contact on a regular basis. Preferably, the articles are designed to experience sliding contact, at least a thousand times, more preferably at least ten thousand times, without wear that is destructive enough to disable the device. In connection with this discussion and with the following exemplary, non-limiting list of articles constructed and arranged to be positioned to withstand sliding contact, those of ordinary skill in the art will readily understand the meaning of this terminology. The invention embraces articles having functionally-graded surfaces in the field of biomedical implants, for example, hip, knee, shoulder, finger joint, and other protheses, pins, screws, and dental implants; mechanical components including the surfaces of gear teeth, (including rack-and-pinion gear surfaces, beveled gear surfaces, etc.) ball bearings, roller bearings, tracks for ball bearings and roller bearings, hinges, latches, railway tracks, railway wheels, and the like. It is a feature of the invention that if at least one surface of a mating surface pair designed to experience sliding contact stress is graded in its elastic (Young's) modulus according to relationships described herein, using exemplary materials as shown in Table 1, contact pressure generated in the graded materials can be at least two times lower than in a similar non-graded material and therefore the material is much more resistant to small scale sliding (sliding contact stress). Ball bearings and railway wheels and tracks do not experience as much sliding contact stress as do some other articles, but sliding contact is experienced. Exemplary articles that experience significant sliding contact include those biomedical devices described above, and other devices such as automobile bearings, piston walls, piston rings, aircraft engine turbines, crankshaft bearings, piston connecting rod bearings, axle bearings, wheel bearings, computer disk drives, car bumpers, tires, brake shoes, brake pads, machine tools such as drilling and milling surfaces, thermal barrier coatings, wear-resistant coatings, roads, airport runways, and the like.

Articles of the invention preferably have a surface constructed and arranged to be positioned to withstand sliding contact stress and to be a functionally-graded material during use. In this set of preferred embodiments, this means that the material is designed not to lose the functionally-graded characteristic of the surface positioned to withstand sliding contact, over the course of normal use. For example, a prior art orthopedic prosthetic implant may include porosity at its surface that would render it a functionally-graded material according to a general definition, but such an implant is designed to experience bone ingrowth after implantation and, over a relatively short period of time, by design the functional gradation of the surface is substantially lost. In addition, porous surfaces of prosethetic implant typically are those surfaces designed to be secured to living bone, rather than surfaces constructed and arranged to be positioned to a stand sliding contact stress. This type of article is not included in the definition of a material constructed and arranged to have a functionally-graded material during use.

Articles of the invention that are constructed and arranged to be positioned to withstand sliding contact stress preferably include a surface that is functionally-graded to the extent that it is at least about 4 times stronger (resistant to at least about 4 times indentation load without fracture) than the same article with a surface that is not functionally graded, more preferably at least about 6 times stronger, more preferably still at least about 10 times stronger. The article can be designed to experience sliding contact with a surface of another article that is not functionally-graded, with another article having a functionally-graded surface, with an article made of substantially the same material, with an article of a substantially different material, or any combination. For example, a replacement ball and socket joint can include a ball made of a first material and having a functionally-graded surface, and a socket made of the first material and having a similar functionally-graded surface for sliding contact with the surface of the ball. This is an example, of course, of two articles of substantially similar material both having a substantially similar functionally-graded surfaces are positioned to withstand a sliding contact stress therebetween during use. As another example, an outer bearing of a device may include a bearing surface that is functionally graded, and a mating inner bearing may be made of a substantially similar material but without functional gradation at the bearing surface. This example of an article constructed and arranged to be positioned to withstand sliding contact stress, and having a functionally-graded surface, where the article is in contact with a second article surface that is not functionally graded can find use where the outer bearing is a portion of a component that desirably is not replaced regularly, but the inner bearing is a portion of a component that is replaced regularly for other reasons.

In this set of embodiments, the surface positioned to withstand sliding contact stress preferably is functionally graded as described herein with respect to other embodiments above. That is, Young's modulus preferably changes as a function of depth, more preferably increasing as a function of depth. Young's modulus can increases as a function of depth at an increasing or decreasing rate, and in a particularly preferred embodiment Young's modulus increases as a function of depth at an decreasing rate. Also, the surface preferably has a Young's modulus of at least about one GPa, where Young's modulus changes as a function of depth from the surface according to the equation $E \propto E_0 z^k$. The article also preferably is locally isotropic at the surface. The surface designed to withstand sliding contact should be of a material having a Poisson ratio of at least about 0.2, more preferably at least about 0.3, and more preferably Young's moduli for these materials is at least about 5 GPa, more preferably at least about 10 GPa. Other preferred features for the material are described above with respect to functionally-graded materials constructed and arranged to be positioned to withstand an indentation tensile stress.

In one set of embodiments, the material of the invention positioned to withstand a sliding contact stress is positioned to withstand stress applied not by another solid article, but by a fluid. For example, turbine blades, marine propeller blades, and the like are embraced by this embodiment.

The present invention also provides articles and constructions, and methods of their manufacture or fabrication, having a layered configuration, designed to withstand indentation without failure in a direction perpendicular to the layered arrangement. The articles and constructions of the invention exhibit superior indentation resistance by diffusing normal load through tailored variation in anisotropy as a function of depth. U.S. patent application Ser. No. 08/818,170 now abandoned, referenced above, describe in-plane isotropic articles that withstand indentation by diffusion of loads through variation of Young's modulus as a function of depth. The present invention involves the surprising discovery that an array of layer units, each having local anisotropy, or overall anisotropy, can define a much simplified construction that exhibits superior indentation resistance.

According to one set of embodiments, the articles and constructions of the invention include layer units each having local anisotropy (or orthotropy). The layer units can be planar, or can be curved in one dimension or in two dimensions to form a curved shape, dome shape, or the like. Where the layer units are planar, "in-plane anisotropy" or "in-plane isotropy" will be used to describe the makeup of the layers. Where "in-plane" is used in this context, it is meant to apply as well to embodiments of the invention in which a layer unit has overall isotropy or anisotropy but is not planar. By "local anisotropy" is meant a heterogeneous construction that can be defined by at least a first component and a second component, the shape of the boundaries between first component and second component each having an average in-plane dimensional ratio of at least about 3 to 1, preferably at least about 5 to 1, and more preferably still at least about 7 to 1 (e.g. fibers, whiskers, platelets, elongated voids or combinations thereof). "Local" in this context means on the scale of the boundaries between first and second components. For example, where a layer is a ply of chopped glass fiber within a resin matrix, with fiber segments each residing essentially in the plane of the ply, the boundary between each fiber component and the resin matrix defines essentially a cylinder having a length to width ratio of at least about 3 to 1, preferably at least about 5 to 1, more preferably still at least about 7 to 1. These materials are locally anisotropic in that examination of a small volume sample from within the material would show that the materials do not have identical mechanical properties, such as Young's modulus, in each direction. Other "locally-anisotropic" materials can include layers of paper, each including randomly in-plane oriented fibrils each having an in-plane dimensional ratio of at least 3 to 1, and other constructions described more fully below.

Figure 14:
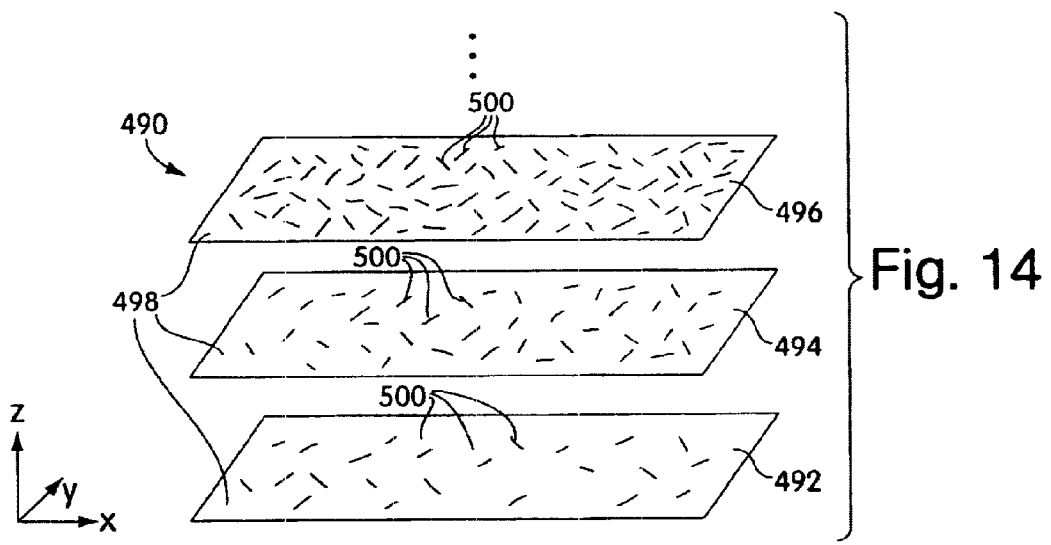
FIG. 14 is an expanded, schematic illustration of another laminate article of the invention.
Figure 15:
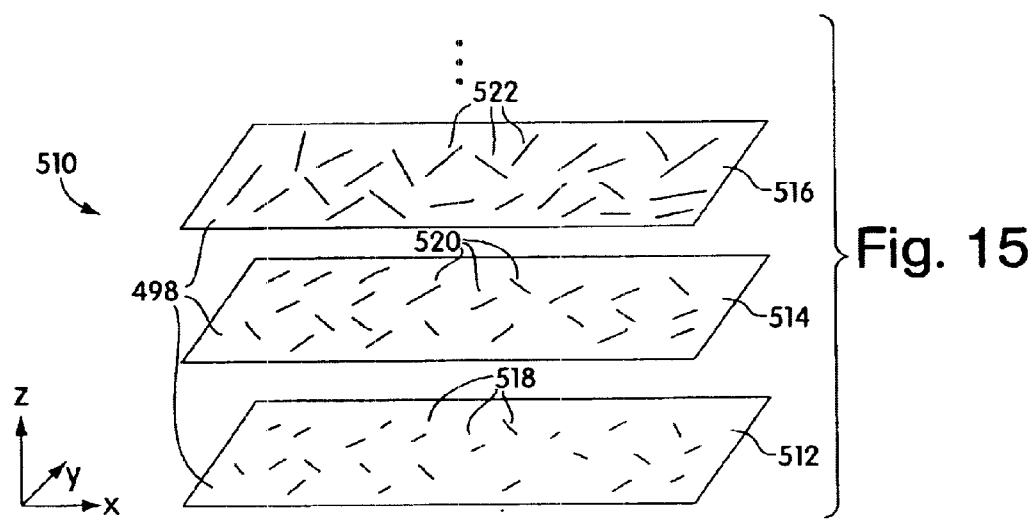
FIG. 15 is an expanded, schematic illustration of another laminate article in accordance with the invention.
Figure 16:
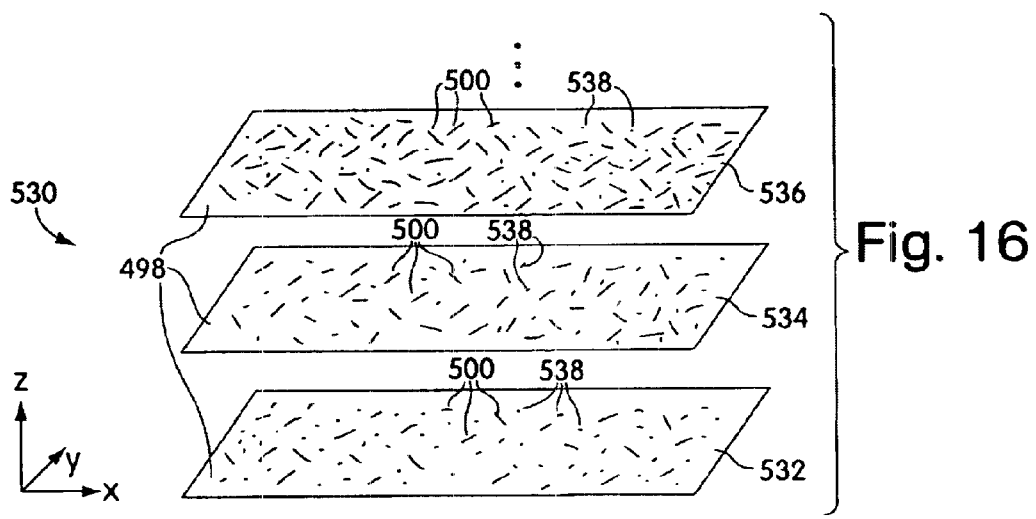
FIG. 16 is an expanded, schematic illustration of another laminate article in accordance with the invention.

While the embodiments including planar arrays of chopped fiber within a polymer matrix or paper pulp including in-plane fibrils are locally anisotropic, these materials are in-layer isotropic overall. They are in-plane isotropic as the chopped fibers or fibrils typically are not aligned, but are randomly directionally oriented in the x-y plane of each layer (FIGS. 14–16). These materials are through-plane (z-direction) anisotropic. The embodiments including stacked, laminated arrays of directionally-oriented, fiber-reinforced polymeric material, or earth or concrete reinforced with directionally-oriented re-rod not only are locally isotropic but also are transversely isotropic, that is, in-plane isotropic.

According to another set of embodiments, the invention provides a stacked array of layer units, each having a principle axis of anisotropy, each unit having an adjacent unit in which the principle axis of anisotropy differs by less than 45°. That is, each unit has a layer direction of anisotropy and each unit has an adjacent unit that differs in a layer direction of anisotropy by less than 45°. This can involve a construction of earth, concrete, or the like reinforced with reinforcing rod (re-rod) or other reinforcing elements (e.g. tubes and beams) having an in-plane dimensional ratio as described above, or the like, made typically of steel, wood, or polymers. In one preferred embodiment the invention is defined by a construction of a plurality of stacked, thin laminae of fiber-reinforced polymeric material stacked to form a thick laminated article. In the case of fiber-reinforced polymeric ply including fibers generally aligned in the plane of the ply, the ply is considered isotropic in the direction perpendicular to the alignment of the fibers. In the case of concrete or earth reinforced with re-rod, each essentially planar unit is defined by generally-aligned linear units of reinforcement and each unit is transversely isotropic in the direction perpendicular to the axial direction of orientation of the re-rod.

Figure 12:
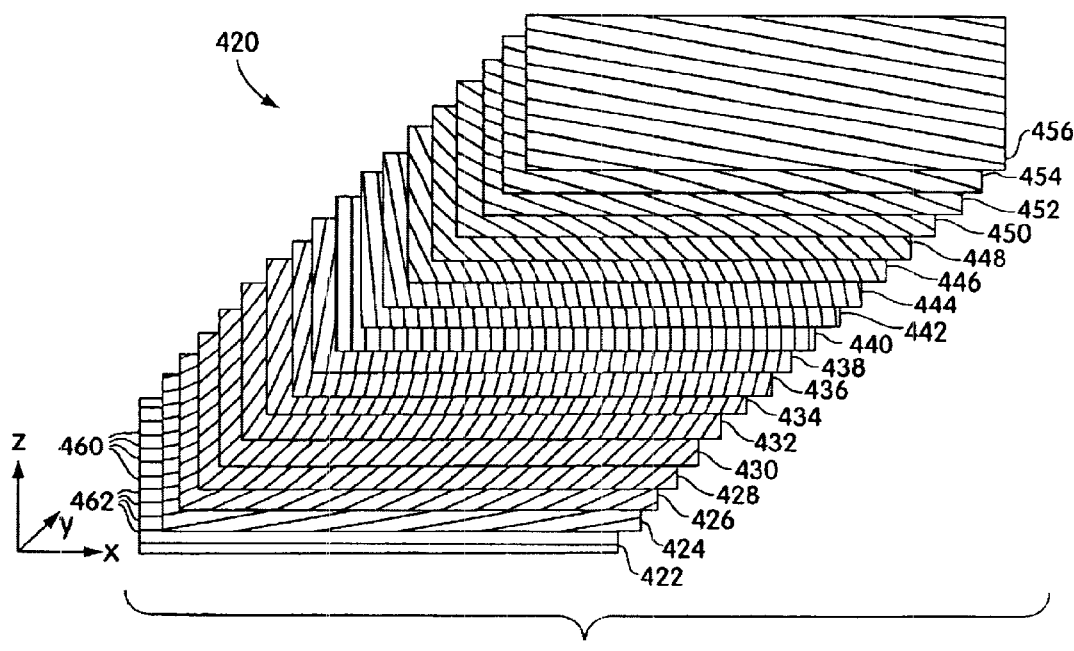
FIG. 12 is an expanded, schematic illustration of a laminate, fiber-reinforced article in accordance with the invention.

FIGS. 12–16 illustrate, schematically, various embodiments of one aspect of the invention. FIG. 12 is a construction 420 of a stacked array of thin laminae of fiber-reinforced polymer illustrated in expanded, prelaminated form for purposes of clarity. Array 20 includes 18 plies 422–456 each including a plurality of essentially aligned reinforcing fibers 460 within a matrix 462. Each ply has a layer direction of anisotropy in a direction perpendicular to the orientation of the fibers. For example, ply 422 has fibers oriented in the x direction thus it has anisotropy in the x-y plane (the properties in the x direction are different from those in the y direction).

The principle axis of anisotropy of each layer is less than 45° different from each adjacent layer, according to this embodiment of the invention. The principle axis of anisotropy is preferably less than about 35°, more preferably less than about 25°, more preferably less than about 20°, more preferably less than about 15°, and more preferably still less than about 12° relative to the principle axis of anisotropy of each adjacent layer. In a set of particularly preferred embodiments, the principle axis of anisotropy differs by less than 10°, preferably less than about 8°, preferably less than about 6°, more preferably less than about 4°, and more preferably still less than or equal to about 2°, between adjacent layers. The invention involves the discovery that, where the principle axis of anisotropy differs by less than 45° between succeeding layers in a layered structured, and a minimum number of layers exists, advantageous properties are realized. In general, when the difference in the angle between principle axis of anisotropy of adjacent layers is minimized, advantageous properties are maximized. This is because a change in characteristic (in this case the elastic modulus), as a function of depth, is smoother and approaches a smooth curve as the difference in anisotropy direction between the layers decreases in value. However, in many instances it is sufficient if the difference in direction of anisotropy between the various layers differs by a larger amount, for example up to almost 45°, and this can save manufacturing cost.

In preferred embodiments the principle axis of anisotropy (or directional orientation of the fibers) changes consistently in direction of rotational orientation from layer to layer in the z direction (in the direction of stacking of the layers), as illustrated in FIG. 12 in which ply 422 is oriented at 0° (relative to the x axis), ply 424 at 10°, ply 426 at 20°, ply 428 at 30°, etc. up to ply 456 which is oriented at 170° (or −10°) with respect to initial ply 422. That is, the principle axis of anisotropy of each succeeding layer differs consistently, in offset direction and amount of offset, from each preceding layer in the preferred embodiment. In some embodiments, the principle axis of anisotropy of each succeeding layer differs consistently in offset direction, but not in amount of offset. For example, an arrangement can include a stacked array as [ ... 20°, 15°, 5°, −20°, −40° ... ].

In one set of embodiments, the layer direction of anisotropy of the units rotates through at least 170° through the stacked array. In preferred embodiments, the stacked array includes a central or near-central ply including stacked plies on either side in which the principle axis of anisotropy changes in the same direction. For example, in the case of a central ply, this arrangement can include an array stacked as [ ... 45°, 35°, 25°, 10°, 0°, 10°, 25°, 35°, 45° ... ], defining a "balanced" or "symmetric" composite. As another example, where the principle axis of anisotropy differs by 2° from each unit to its adjacent unit, the balanced composite will define a stacked array as [ ... 8°, 6°, 4°, 2°, 0°, 2°, 4°, 6°, 8° ... )].

This balanced, symmetric laminate can be useful in many situations since the material is better able to withstand bending. In many instances such as use of the material for ship hull, car fender parts, and the like, bending should be avoided. In other instances, for example where an article is constructed and positioned to withstand indentation from a projectile such as a bullet, and is not required to carry any other load normal to its surface other than withstanding this impact, the balanced arrangement is not necessarily advantageous. This is because a ship hull, or the like must withstand a force constantly applied normal to the surface of the hull, i.e., water with floating articles, thus must have macroscopic strength, and must also be able to withstand an indentation event such as striking a sharp object (e.g., a projectile or underwater hazard) while being resistant to fracture damage from such an impact. A bulletproof vest, on the other hand, should withstand fracture or penetration damage from a bullet, but typically need not provide macroscopic structural strength.

Typically, plies 422–456 will be identical in composition, and differ only in their fibril orientation as illustrated. That is, the layer units, each viewed in isolation, have, prior to assembly, x-axis mechanical properties, y-axis mechanical properties, and z-axis mechanical properties that are essentially identical to each other.

Figure 13:
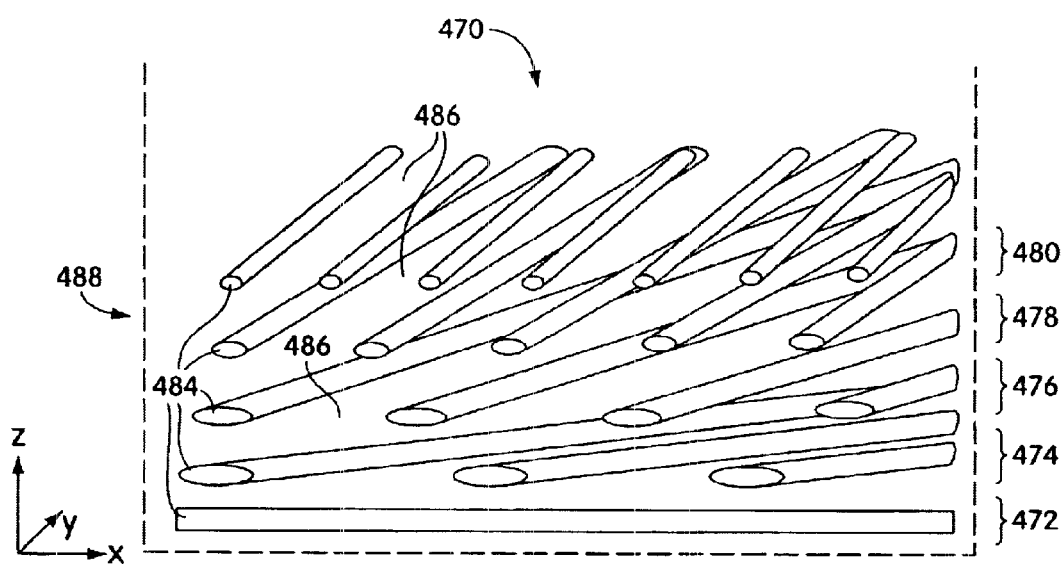
FIG. 13 is a schematic illustration of a multi-layer article including reinforcing elements in a continuous matrix in accordance with the invention.

FIG. 13 illustrates another embodiment of the invention defined by a construction 470 including five layer units 472–480 each defined by an essentially planar arrangement of reinforcing elements 484, the reinforcing elements 484 of each of the units 472–480 aligned linearly in a direction of the layer. Each unit has a principle axis of anisotropy perpendicular to the orientation of the reinforcing units 484, and the principle axis of anisotropy of each unit differs from that of each adjacent unit by less than 45° or other preferred differences in direction noted above. The reinforcing units 484 are embedded within a continuous matrix of material 486 that supports reinforcing units 484 and is less prone to failure, upon an impact having a component in the z direction, due to the arrangement of reinforcing elements 484. Elements 484 also can be supported, with respect to each other, by connecting members. Construction 470 can be a cement construction, in which elements 484 are re-rod and matrix 486 is cement, the boundary represented by dotted line 488 defining a form in which the cement is poured, an earthen boundary in which the cement is laid, or the like. Matrix 486 also can define earth, with reinforcing elements 484 defining stabilizing rod, wooden poles, polymeric fibrous reinforcing elements, concrete reinforcing elements, or the like. As in the embodiment of FIG. 12, the direction of principle axis of anisotropy can preferably change consistently in rotational orientation from layer unit to layer unit in the z direction. Also, as in the embodiment of FIG. 12, each layer unit is essentially identical, having essentially identical x, y, and z-axis mechanical properties, respectively.

Referring now to FIGS. 14–16, exemplary embodiments of the invention are shown of stacked arrays of at least five layer units, each being isotropic overall, but having heterogeneity and local anisotropy in at least one direction. Each unit has an adjacent unit that differs in a mechanical property. FIG. 14 illustrates one embodiment of the invention including a stacked array 490 (illustrated in expanded form for purposes of clarity) of layers 492, 494, and 496 ... each defined by an essentially planar matrix 498 in which is embedded chopped fiber particles 500. The chopped fiber particles each are aligned essentially randomly in the x-y plane of the layer 492, 494, or 496, and each has a length at least three times its width, thus each layer is locally anisotropic. In the embodiment of FIG. 14 each layer differs in a mechanical property relative to each adjacent layer in that each of layers 492, 494, and 496 ... includes an increasing density of chopped fiber components 500, that is, an increased ratio of chopped fiber component to supporting matrix 498. Typically, the increase in chopped fiber component density will result in increased Young's modulus (E), Poisson ratio (v) and/or tensile strength in both the x and y direction of each layer. The difference in mechanical properties between layers preferably changes consistently in the z direction, that is, where the mechanical property changes in value from a layer 492 to layer 494, it also changes in the same way qualitatively from layer 494 to 496, etc. That is, where the mechanical property increases or decreases in value from a layer 492 to layer 494, it also increases or decreases, respectively, from layer 494 to 496, etc. Most preferably, the mechanical property value increases consistently over a certain range in the z direction, that is, the difference in mechanical property between layer 492 and 494 is equal to the difference in mechanical property between layer 494 and 496, etc., and/or the ratio of difference in mechanical properties between layers increases consistently, that is, the ratio of the mechanical property of layer 494 to layer 492 is the same as the ratio of the mechanical property of layer 496 to layer 494 (or follows a predetermined function of depth), etc.

FIG. 15 illustrates another embodiment of the invention in which a multi-layer structure is provided, each layer having local anisotropy in at least one direction and each to layer having an adjacent layer that differs in a mechanical property. FIG. 15 is similar to FIG. 14 in that construction 510 includes a plurality of layers 512, 514, and 516 ... defined by chopped fiber components embedded within a polymeric matrix 498. Construction 510 differs from construction 490 in that the length of fibril components increases in successive layers. That is, fiber components 518 of layer 512 are of essentially consistent lengths within layer 512, but fiber components 520 of layer 514 are longer than fiber components 518 of layer 512, and fiber components 522 of layer 516 are longer than fiber components 520 of layer 514. The increased length in fiber components in adjacent layers preferably increases consistently over some distance in the z direction. The increase in length of fiber components in the z direction can result in increased tensile strength, Young's modulus, and/or Poisson ratio, in part because of the increase length in structural reinforcement component and in part due to an optional increase density of fiber component. That is, if an equal number of fiber components exist per unit area of each of layers 512–516 ..., the increased length of the fiber components will result in increased fibril component density. Chopped reinforcing fibers can differ, between layers 512, 514, 516, etc., in diameter rather than length, or both in diameter and length, as well.

FIG. 16 illustrates yet another embodiment in which a construction 530 includes stacked layers 532, 534, 536 . . . Each layer includes fibril components 500 that increase in density with each layer, as in FIG. 14. Construction 530 differs in that each layer includes an auxiliary component 538 (illustrated as particulate material in FIG. 16) that decreases in density as fibril component 500 increases in density in the layers. That is, layer 532 includes an approximately equal number of fibril components 500 and particulate component 538, layer 534 includes an increased ratio of fibril component 500 to particulate component 538, and layer 536 includes a yet increased ratio of fibril component to particulate component. In this embodiment, the overall weight, density, or other property of each of layers 532–536 . . . can be kept essentially equal, if desired, by balancing the removal of fibril component 500 with the additional of particulate component 538. Addition or removal of other components, as the amount of fibril component 500 decreases in successes layers, can be carried out to tailor these properties as well as acoustic properties, electromagnetic properties, and the like.

One advantage of orientation of fibers 500, 518, 520 or 522 of FIGS. 14–16 in an essentially in-plane orientation is that crack resistance, upon indentation (contact damage), is minimized. Failure of an article, upon excess indentation force in a direction normal to a surface of the article typically involves formation of cracks that descend into the article. The in-plane orientation of the fibers is nearly perpendicular to typical crack formation upon indentation, providing maximal indentation resistance.

In each of the constructions of FIGS. 14–16, the constructions are positioned to withstand an impact having a component in an upward direction. That is, with reference to FIG. 14, the construction is positioned to withstand an impact against the lower surface of layer 492, the impact having a component in the direction of layers 494, 496, . . . With respect to FIG. 15, the construction is positioned to withstand an impact against the lower surface of layer 512 in the direction of layers 514, 516 . . . , and in the case of the construction of FIG. 16, to withstand an impact against the lower surface of layer 532 having a component in the direction of layers 534, 536 . . .

In the embodiments illustrated in FIGS. 14–16 the order of layers can be reversed. That is, the directionality of change in mechanical property away from a surface of the article, for example a surface designed to withstand indentation, can increase or decrease.

The articles of the invention are able to withstand indentation, and optionally include instructions for use to withstand indentation, as described herein, and preferably are designed to withstand repeated indentation. By being "repeated indentation" is meant a plurality of impacts that could occur during the normal course of use of the device. This set of embodiments is to be distinguished from the "one-use" articles such as bullets, shells, or the like, and includes saw teeth, excavating tool, cutting surfaces, road beds, airport runways and other articles that those of ordinary skill in the art would understand are designed to be subjected to, and are subjected to, repeated indentation.

Described above, with reference to FIGS. 12–16, are a variety of constructions including a plurality of layer units. As used herein, "layer unit" is meant to define a layer, or a layer-shaped component of a construction. The array of layer units can be essentially planar, or nonplanar. That is, the stacked array need not be planar overall, but can be curved along either of the x or y axes, or both to form a dome shape. But locally, in the z direction, the construction appears essentially to be a planar array. The construction of the invention is designed to withstand, without failure, a contact load having a component normal to a tangent of its surface. This means any tangent of the surface. That is, where the construction has a non-planar surface, it is designed to withstand a contact load having a component normal to any tangent of the non-planar surface. The component normal to the tangent of the surface is that portion of, for example, an impact having a vector force directed perpendicular to the tangent. That is, the construction is designed to withstand contact directly perpendicular to the surface, and/or indentation incident upon the surface from a non-perpendicular direction, such as a glancing blow or impact.

The construction of the invention can be essentially planar, for example, a roadway or airport runway construction or building footing, or non-planar, having a curved configuration, such as an automobile hood, fender, rooftop, bumper, rim, tire, or the like or a curved piece of armor such as a tank turret, gun turret, bunker, helmet or vest, or the like or a curved aircraft component such as a fuselage component, glass, cockpit glass, engine housing, nose cone, wing section, or the like. Also included are ship or boat components such as hulls, propeller blades, and other components that can be subjected to indentation or contact damage. Additional constructions can include walls for race tracks designed to withstand indentation from a race car, guard rails or walls by roads, docks, other crash-resistant walls, clothing designed to withstand impact (for example, firemen's, policemen's, construction workers' protective clothing or the like) where various fabric plies include directionally-oriented fibers laid up with principle axis of anisotropy less than 45°, or overall isotropic layer units, each having local anisotropy with layer units differing in mechanical properties, as described above. Another example of a clothing construction of the invention is a shoe sole, a construction worker's protective toe reinforcement, etc. Also included are ball-and-socket joints, such as the ball of a hip replacement or a socket of a hip replacement, both of which are designed to be subjected to repeated impact, or indentation. Also included are dental objects such as tooth caps and other dental articles and replacements that are subjected to repeated impact or indentation. Even though some of these components are curved, a cross-sectional view of the components, on a scale showing clearly the thickness of each stacked unit, will show units that are essentially planar. The relative thickness of the units or layers is described more fully below.

In preferred embodiments the arrays of the invention include at least five layer units. And it has been found, in accordance with the invention, that when the stacked array of the invention has at least six layer units maximal resistance of lateral impact is realized. Where at least six layers exist, disproportionately increased impact resistance is observed. That is, in one set of embodiments at least six units are provided, at least seven in another embodiment, at least eight in another embodiment, at least nine in another embodiment, and at least ten in yet another embodiment. In one set of preferred embodiments at least five, preferably six, more preferably seven, more preferably at least eight, and more preferably still at least nine layer units exist on either side of a central ply of "balanced" or "symmetric" stacked array as described above.

A wide variety of articles can be constructed in accordance with the invention and positioned to withstand, without failure, indentation. With reference to FIG. 12, a multilayer laminate composite, often referred to as a preform made up of individual layers of prepreg, can be provided. Each layer (ply or prepreg) typically includes a thermoset or thermoplastic resin 462 containing embedded, aligned, and/ or interlaced (e.g. woven or braided) fibers 460, such as fibers of glass, silicon carbide, carbon, or the like, or co-mingled fiber fabric defined by fibers or resin and reinforcing fibers co-mingled into a yarn woven into a fabric. The fibers or woven fabric can be embedded in a thermoset material 462 such as epoxy, rubber strengthened epoxy, BMI, PMK-15, polyesters, vinylesters, and the like, or a thermoplastic material 462 such as polyamides, polyimides, polyarylene sulfide, polyetherimide, polyethylene, polyesterimides, polyarylenes, polysulfones, polyethersulfones, polyphenylene sulfide, polyetherimide, polypropylene, polyolefins, polyketones, polyetherketones, polyetherketoneketone, polyetheretherketones, polyester, and analogs and mixtures thereof. Examples of preforms include TORLON thermoplastic laminate, PEEK (polyetheretherketone, Imperial Chemical Industries, PLC, England), PEKK (polyetherketoneketone, DuPont) thermoplastic, T800H/3900-2 thermoset from Toray (Japan), and AS4/3501-6 thermoset from Hercules (Magna, Utah). Other laminate arrangements such as those described in U.S. Pat. Nos. 5,624,386, 5,064,439, 5,591,233, or 5,522,904, each incorporated herein by reference, can be used.

As mentioned, a woven cloth or fabric can be provided embedded in a thermoplastic or thermoset matrix. That is, with reference to FIG. 12, the plies 422–456 can include fibers that are not shown and that are perpendicular to, and woven into, fibers 460. Additionally, each layer, or ply 422–456 of FIG. 12, and each essentially planar unit 472–480 of FIG. 13 can include multiple planar units of fibers 460 (FIG. 12 or reinforcing elements 484 (FIG. 13)). That is, a plurality of plies 422 can be stacked one upon the other, each including fibers 460 that are essentially parallel with each adjacent ply 422, then a plurality of plies 424 can be stacked thereupon, with all of the fibers of the multiple plies 424 in alignment with each other, followed by a plurality of stacks of plies 426, etc. and with reference to FIG. 13, a plurality of essentially planar units 472 can exist and be stacked in the z direction, followed by a plurality of units 474, etc. That is, the important feature of the invention is that where a change in principle axis of anisotropy occurs, it occurs in an angular orientation of less than 45° or other preferred orientations above. In one set of embodiments, only a single layer unit including a single layer of linear reinforcing elements is provided for each successive direction of planar anisotropy.

As another example of a stacked array of essentially planar units, each unit having an adjacent unit differing in a principle axis of an anisotropy, is a stacked array of layers of wood having a grain direction that differs, between each adjacent layer, by less than 45°. Glue-laminated structural wood members are known including different layers oriented in different directions, and the orientation of such layers in an array as described herein in terms of planar anisotropy directionality is intended to be within the scope of the present invention.

Other layered structures intended to be encompassed within the invention include oriented polymers. For example, uniaxially-oriented polymer sheets, each having a direction of orientation offset from each adjacent layer by less than 45°, can be provided. With reference to FIG. 12, the direction of orientation of each layer can be in the direction of fibers 460 of sheets 422–456, as illustrated. Biaxially-oriented polymers can be provided as well, and in this embodiment the arrangement is the same except that each sheet has a direction of orientation, not shown, perpendicular to the direction of fibers 460.

Also included in the invention are fibrous composite articles, as illustrated in FIG. 12, in which the fibers are chopped, but aligned. That is, chopped fibers embedded in a continuous matrix as illustrated in FIGS. 14 and 15 can be provided, with the chopped fibers aligned in a single planar direction. With reference to FIG. 12, in this embodiment a plurality of layers 422–456 can be provided, each including chopped fibers aligned in the direction of fibers 460 as illustrated. A variety of composites suitable for use in the present invention, including continuous fibrous plies as illustrated in FIG. 12, and chopped, aligned fibers described immediately above, are described in U.S. Pat. No. 5,439,627, incorporated herein by reference.

Filaments or fibers typically used in such plies are of diameters between about 0.3 micron and 0.3 millimeter, more preferably between about 1 micron and 0.2 millimeter. Suitable fibers and filaments also include those from the group including aramide, boron, carbon, ceramic, glass, graphite, metal, silicate, and the like.

Also included are ceramic and glass matrices reinforced with fiber, such as SiC fiber-reinforced ceramic matrix composites as described in U.S. Pat. No. 5,605,868 (Chyung), incorporated herein by reference. Also included are ceramic, metal, polymeric, concrete or other materials reinforced with fibers or a woven mesh of another material, or other materials reinforced with ceramic, metal, polymeric, concrete, iron or other material as reinforcing fibers or woven material. Distributed long voids or void networks, with similar topology as reinforcing particles, can serve the same purpose. In any of these embodiments the fibers can be fiber segments oriented as illustrated in FIGS. 14–16.

Also included are rolled steel sheets, each having a principal axis of anisotropy offset from each adjacent layer as described herein. When the sheet metal is rolled, either hot-rolled or cold-rolled, in-plane anisotropy results. The sheets can be laid up with principal axes of anisotropy as described.

The article or construction of the invention is constructed and positioned to withstand, without failure, indentation having a component normal to any tangent of the surface of the article. That is, where the article is essentially planar, the article is positioned to withstand an indentation having a component normal to the surface, and where the surface is non-planar, it is constructed and positioned to withstand indentation having a component normal to the tangent of the non-planar surface. "Constructed and positioned to withstand indentation" is meant to include an article constructed and positioned to withstand indentation including contact damage, impact events, penetration or the like such as a projectile striking the surface, a heavy object falling onto the surface, aircraft landing on a runway, and the like. This definition encompasses road and runway foundations, bulletproof armor, casing for tools that typically are dropped or struck by objects, car bumpers, fenders, and other components. "Impact" in this context also can define events that do not necessarily involve one object coming into contact with another, but involve impact through one object in contact with another object, for example, the impact of a building on a foundation of a building resulting from impact events within the building, vibration, and the like, static loading and periodic loading such as snow, ice, etc.

The articles of the invention also can include instructions for use of the article in withstanding indentation (contact damage) having a component normal to any tangent of its surface, such as indentations having a component normal to a tangent of the surface of at least 1/10 the tangential force tolerable without failure of the construction, or other preferred impact-resistant properties recited herein. Those of ordinary skill in the art will understand the meaning of what is encompassed by such instructions, including instructions on or within packaging of such articles, or included within specification sheets, advertising, or other materials associated with the manufacture, use, or sale of such components.

"Constructed and positioned to withstand indentation" is meant to be interpreted from any frame of reference. That is, articles of the invention that are constructed and positioned to withstand indentation can be stationary, and positioned to withstand an impact from a moving object (in the case of a bunker designed to withstand an impact from a shell) or can be a moving object, such as a car component as described above, or a bullet, shell, or missile. For example, an armor-piercing shell includes a surface "constructed and positioned to withstand indentation" in that it is designed to withstand, without failure, impact against a piece of armor that it is designed to penetrate, and construction of such a shell casing using the constructions described herein is within the scope of the invention. Other articles of the invention that are constructed and arranged to withstand indentation and may be subjected to repeated indentation, and may be moving and may strike a stationary object, include saw teeth, excavating tool teeth, cutting surfaces such as those of mining bits, and the like. The article, according to preferred embodiments, is constructed and positioned to withstand, without failure, indentation having a component normal to any tangent of the surface of at least 1/10 the tangential force that the article can withstand without failure, or is designed to withstand. In preferred embodiments the article withstands such indentation having a component, normal to any tangent of the surface, of at least about 1/7, preferably 1/5, more preferably 1/3, and more preferably still at least about one half the tangential force tolerable by the article without failure. "Without failure" in this context means without (or with much less than that of homogeneous composites) cracking, delamination, or other mode of failure under a particular loading range, observable upon microscopic examination of the article (such as failure shown microscopically in FIG. 21), optionally after slicing the article and examining cross-sectional sections as described below with respect to the examples section of this application.

The layers or planar units of the construction of the invention have a z-direction dimension, or thickness, that is related to the contact radius of an indentor that applies an indentation tensile stress, or impact, to the surface of the article, or a thickness that is related to the contact radius of an indentor that the article is constructed and positioned to withstand. Those of ordinary skill in the art will understand the meaning of "indentor", as defined herein to be, for example, a portion of an aircraft tire in contact with a runway surface during maximum impact during landing, a portion of a tire or wheel of a vehicle resting on or passing over a roadway and causing an impact force, a portion of a building support structure resting upon a layered building foundation of the invention, a bullet or shell where the layered structure of the invention is armor, a typical surface by which a car bumper, fender, or the like is designed to be struck while resisting failure (e.g., a bumper of another car, a fire hydrant, telephone pole, tree, etc.). The z-direction dimension of the layer units (thickness) is less than about 1/5 the contact radius of the indentor, more preferably less than about 1/8, more preferably less than about 1/10, more preferably still less than about 1/15, and more preferably still less than about 1/20 the contact radius.

Figure 25:
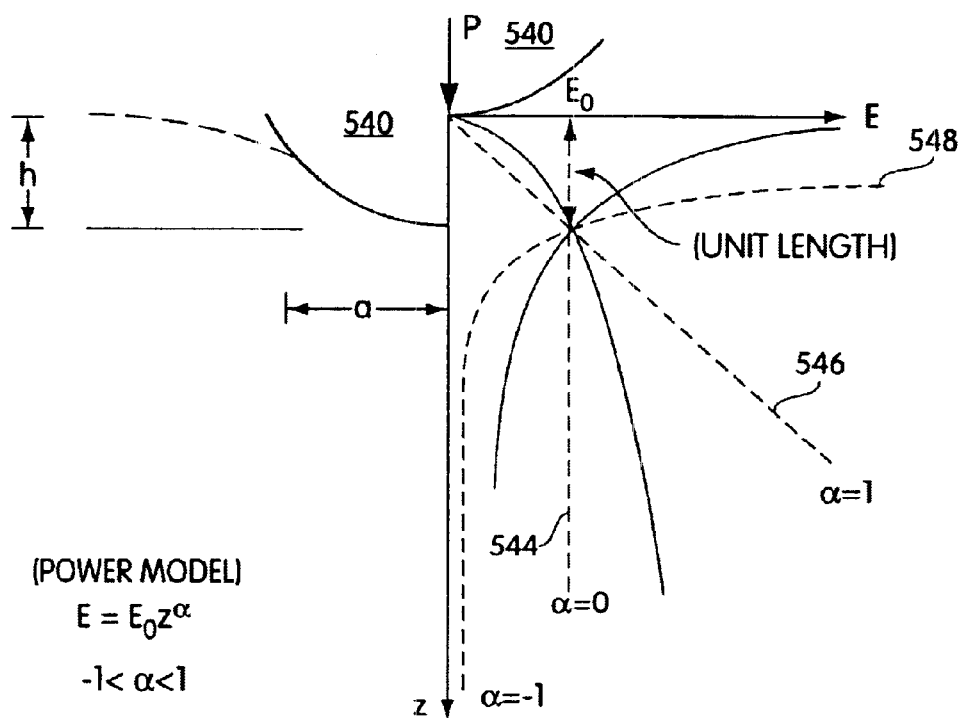
FIG. 25 is a graph of a principal Young's modulus with respect to depth in a graded material of the invention wherein the variation in Young's modulus follows a power law.

As mentioned above, U.S. Pat. Ser. No. 08/818,170, incorporated by reference above, describes materials in which Young's modulus increases as a function of depth, and the present invention embodies the discovery that, surprisingly, orientation of fiber-reinforced plies in a particular manner (described above) or arrangement of layers of in-layer isotropic, but locally anisotropic layer units, each differing in a mechanical property, can achieve this variation in Young's modulus that leads to superior indentation resistance. With reference to FIG. 25, explanation of this phenomenon is presented.

Articles of the invention have one of the principal elastic (Young's) modulus (E) that varies with the depth of the material according to a variation $\alpha$ and a function that can be approximated by a power law equation. The linear variations with depth can also be extracted. Graphs illustrating the variation in Young's modulus as a function of depth according to the power law model equation are shown in FIG. 25. The other principal moduli must be constant fractions of the first one.

Referring now to FIG. 25, a power law model is shown which is representative of preferred embodiments of the present invention. For materials that follow the power law model, at given load P, an indentor 540 used to apply a load to the surface of the material will cause a displacement to a depth h, and have a contact radius a. The value of h at a given load P will be a function of the elastic (Young's) modulus, which in a functionally graded material that follows the power law model, will vary as a function of depth according to the following equation: $E=E_0 z^\alpha$, where $-1 < \alpha \leq 1$. Line 544 illustrates the case where $\alpha=0$. Line 546 illustrates the case where $\alpha=1$. Line 548 illustrates the case where $\alpha=-1$. In the present invention, the material is harder below the surface, and the variation a is greater than zero (approximated by line 546). In this embodiment, $E_0$ is the representative elastic modulus close to the surface of the material, i.e., where $z=1$, or a unit length selected by the investigator and should be within twice the contact radius a or less. Preferred articles of the present invention follow the equation $E=E_0 z^\alpha$, where $0 < \alpha \leq 1$, that is, a law as represented by line 546 of FIG. 25.

In both of the cases, i.e., using the exponential model or the power law model, the Young's modulus $E_0$ should be greater than 0. The Poisson ratio is assumed to be known, and is typically greater than or equal to zero, and less than 0.5.

While the actual elastic variation in a material of the invention can differ slightly from either of these models, these models approximate behavior of articles of the invention where the variation is continuous and monotonic to a depth of about three times the radius of the indentation area.

The function and advantage of these and other embodiments of the present invention will be more fully understood from the examples below. The following examples are intended to illustrate the benefits of the present invention, but do not exemplify the full scope of the invention.

EXAMPLES

Figure 2:
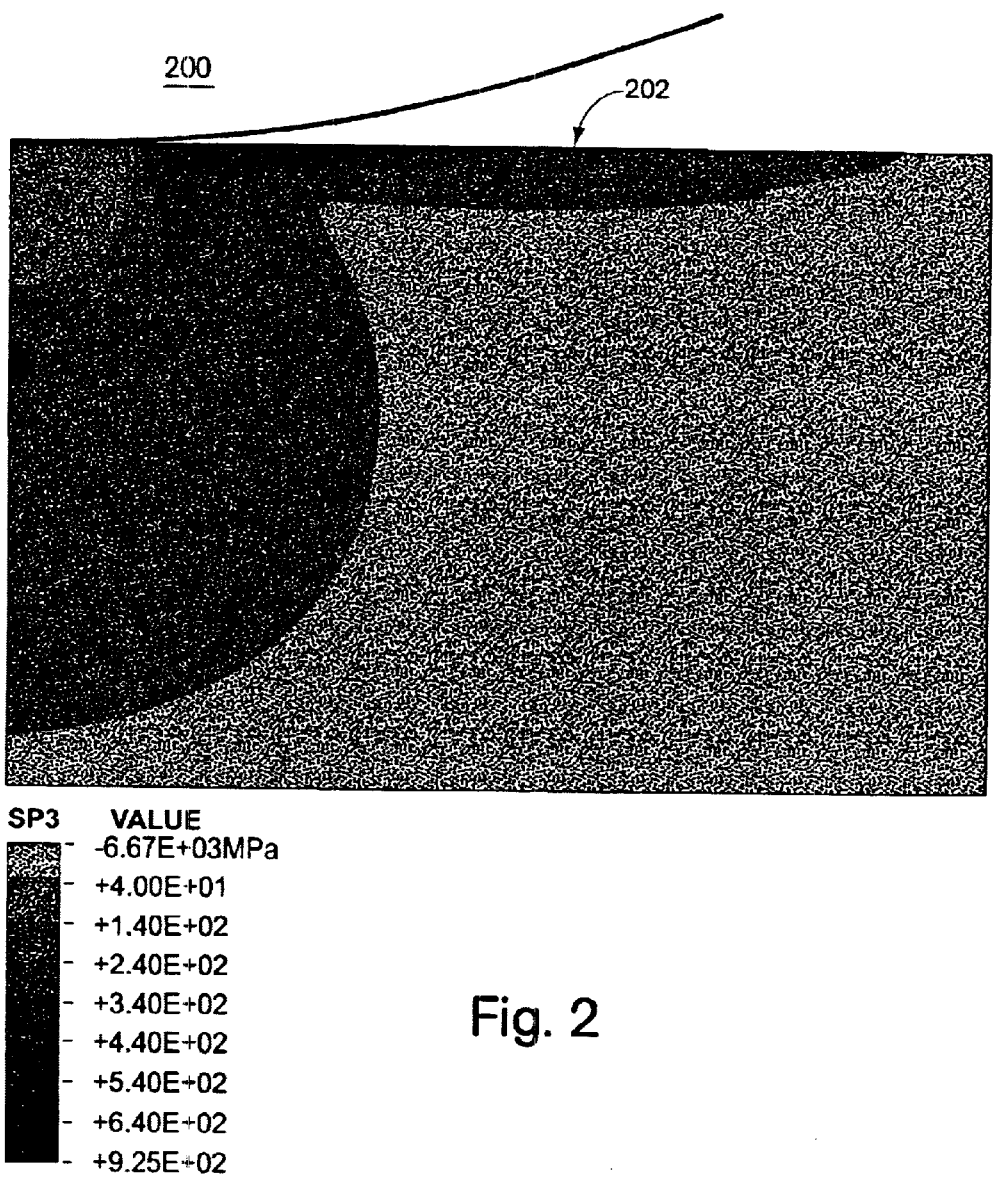
FIG. 2 is a computer-simulated stress field for alumina subject to an indentation stress.
Figure 3:
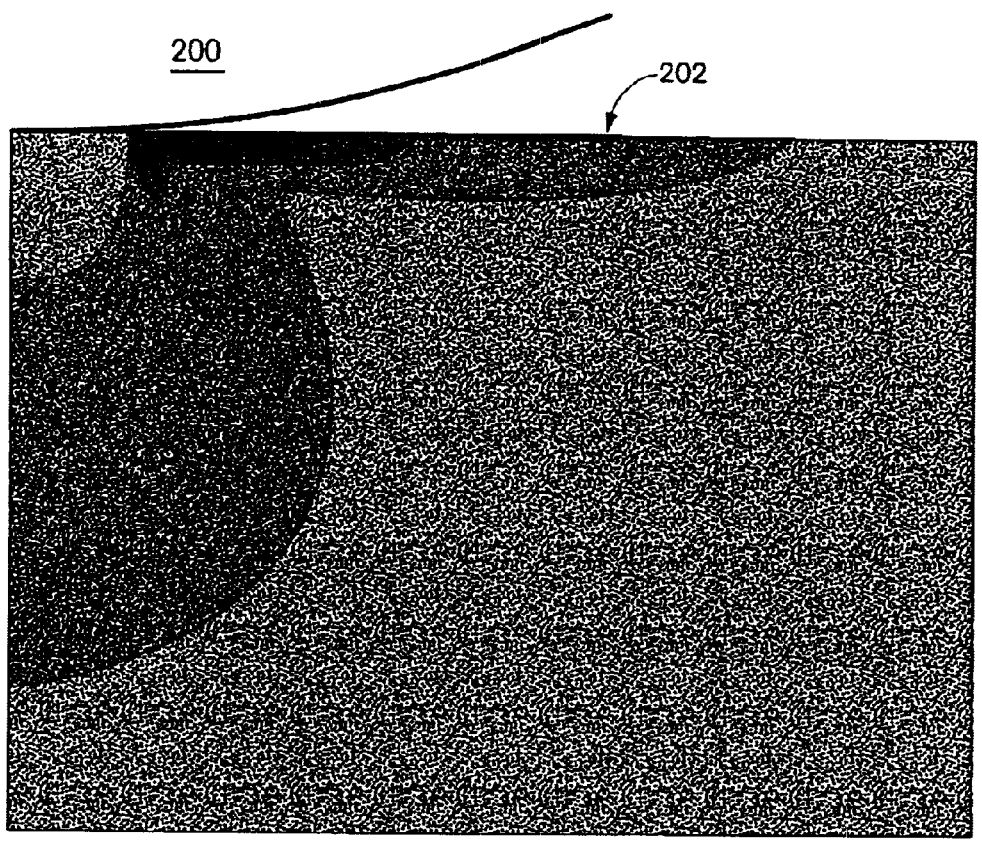
FIG. 3 is a computer-simulated stress field for a functionally-graded material subject to an indentation stress.
Figure 6:
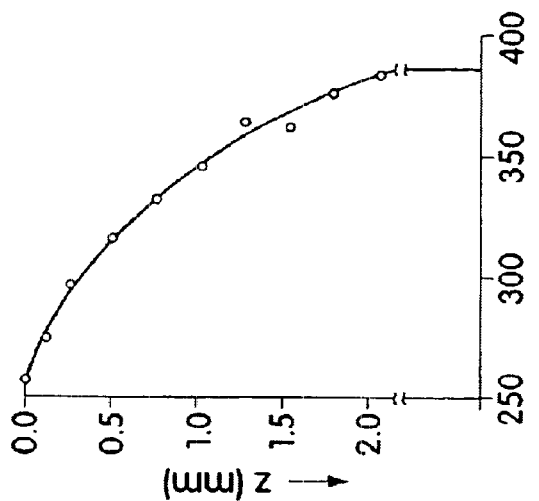
FIG. 6 is a plot of functional gradation as a function of depth in terms of E, respectively.

A. Measurement of Mechanical Properties of Materials and Fabrication of Man-Made Functionally-Graded Constructions Computer simulation was used to test the theory outlined above concerning materials in which E increases as function of depth. A material having E varying as a function of depth as plotted in FIG. 6 (below), was analyzed in accordance with following equation and computer analysis where E is in GPa units and z is in mm units. Poisson ratio is 0.22. The $$E = 254 + 85.325 z^{0.496755}$$

analysis assumed a spherical, tungsten carbide cobalt indentor (E=614 GPa, v=0.22), of 4.76 mm radius and an applied load of P=3000N. It was found that for a functionally-graded material as described below in connection with FIG. 6 a=0.417 according to the theoretical treatment above, and 0.39 according to experiment. For homogeneous alumina, a=0.375 according to theory and 0.36 according to experiment. The computer simulation of stress fields for alumina is shown in FIG. 2, in which an indentor 200 is shown applying a force to a surface 202 of the alumina. Maximum stress of $9.25 \times 10^2$ MPa is observed. Under identical conditions indentation of the S-FGM material (FIG. 3) results in maximum stress of only $7.71 \times 10^2$ Mpa.

Discussion of Functionally-Graded Material Having Young's Modulus (E) Increasing as a Function of Depth Due to their innate hardness and stiffness, ceramics are routinely used in components whose surfaces are subjected to extremely high stresses over highly localized contact areas. In the elastic limit, such contact loading (or Hertzian indentation), usually delivered by a punch or a sphere, can produce Hertzian cracks of the shape of a truncated cone (frustum). The principal tensile stresses generated by the indentation cause these cracks to initiate just outside the contact circle and propagate downward and outward into the material. These Hertzian cone cracks, which are extremely deleterious to the strength and the wear properties, compromise the overall structural integrity of the ceramic component. See, for example, Lawn, B. R. "Fracture of Brittle Solids—Second Addition", Cambridge University Press, Cambridge, UK (1993) for a review of indentation of brittle materials.

Currently there are two different approaches that are employed to prevent the formation of Hertzian cone cracks in ceramics. The first approach involves the creation of a macroscopic skin of compressive residual stresses at the surface, similar to tempered glass (Lawn, above). Although this approach is successful in glass, in most structural ceramics it is almost impossible to create a compressive surface skin by ordinary means. The second approach involves introducing heterogeneities within the microstructure of the ceramic. These heterogeneities are usually in the form of elongated grains with weak grain boundaries. Under contact loading these weak grain boundaries fail in shear resulting in a zone of distributed shear faults beneath the contact circle, in place of Hertzian cone cracks. Although the second approach is applicable to a wide variety of structural ceramics, it involves inelastic, irreversible deformation, making that ceramic prone to fatigue-related degradation.

Example 1

Figure 4:
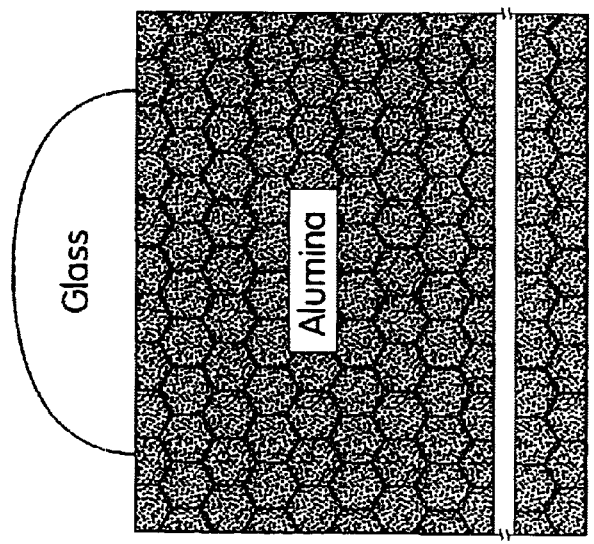
FIG. 4 is a schematic illustration of alumina.

Processing of Functionally-Graded Material of the Invention Having Young's Modulus (E) Increasing as a Function of Depth A novel method was devised to fabricate a S-FGM ceramic. This method consisted of the following steps: (i) A disk (4 mm thickness, 25 mm diameter) of a commercially available dense, polycrystalline (grain size 3 μm) aluminum oxide (alumina) (AD999, Coors Ceramic Company, Golden Colo.) was placed on one of the circular faces using routine metallographic procedures. (ii) Placed a piece (3 g) of a commercially available alumina-soda-lime-silicate glass (Code 0317, Corning Inc., Coming, N.Y.) on the polished alumina surface in the center. (iii) The alumina, with the glass piece on top, was placed in a box furnace (Thermolyne, Fisher Scientific, Fair Lawn, N.J.). (iv) The specimen was heat-treated at 1690° C. for 2 hours with a heating and cooling rate of 600° C./hour (FIG. 4).

Figure 5:
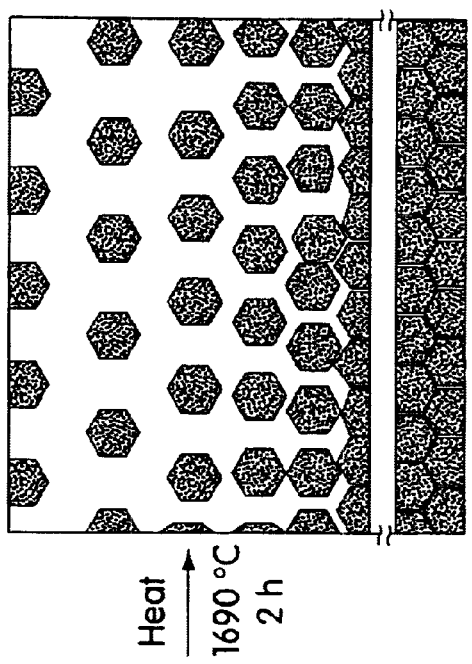
FIG. 5 is a schematic illustration of alumina infiltrated with glass to make a functionally-graded material.

During heat treatment the glass melted and penetrated the grain boundaries of the alumina, as shown schematically in FIG. 5. Excess glass on the surface of alumina was ground off using a surface grinder. The cross section of the resulting S-FGM was polished using routine metallographic procedures. The polished surface was then etched using 2% hydrofluoric acid (HF). The HF dissolved the glass preferentially. The etched surface was then observed in a scanning electron microscope. The vol % of the etched-away glass was measured using routine image analysis procedure. Elastic modulus of the S-FGM as a function of the depth z below the surface was then calculated using the following formula: $E_{S-FGM}(z) = V_{Glass}(z) E_{Glass} + (1 - V_{Glass}(z)) E_{Alumina}$, where elastic moduli of pure glass and pure alumina are $E_{Glass} = 71.7$ GPa, $E_{Alumina} = 386$ GPa, and $V_{Glass}(z)$ is the volume fraction of the glass in the microstructure at depth z. The $E_{S-FGM}$ profile as a function of z is plotted in FIG. 6. The Poisson's ratios (v) for both glass and the alumina, and thus the S-FGM, are identical=0.22.

Figure 7:
FIGS. 7, 8, and 9 are photocopies of photomicrographs of the functionally-graded material described with reference to FIGS. 4–6 at different depths.
Figure 8:
Figure 9:
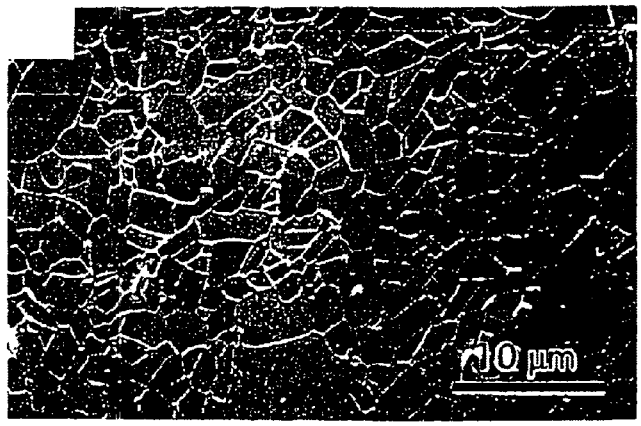

FIGS. 7–9 are photocopies of photomicrographs of the infiltrated sample after HF etching. FIG. 7 is the top of the sample, FIG. 8 is the middle of the sample, and FIG. 9 is the bottom of the gradation section of the sample.

Example 2

Figure 10:
FIG. 10 is a photocopy of a photomicrograph of a cross-section of alumina that has been cracked as a result of indentation stress.
Figure 11:
FIG. 11 is a photocopy of a photomicrograph of a cross-section of a functionally-graded material that has withstood, without cracking, the same indentation stress applied to the material of FIG. 10.

Indentation Testing of Functionally-Graded Material of the Invention Having Young's Modulus (E) Increasing as a Function of Depth A bonded-interface procedure was used to observe the contact damage resulting from Hertzian indentation in both the S-FGM and the pure alumina control, and is described as follows Guiberteau, et al., "Effect of Grain Size on Hertzian Contact Damage in Alumina", *J. Am. Ceram. Soc.* 77, 7, 1825–1831 (1994). Bar specimens 20 mm×4 mm×4 mm were cut out from the S-FGM of Example 1 and the pure alumina disks using a diamond cut-off saw. One long face of each the bar specimens was polished. In the case of S-FGM, the polished long face was perpendicular to the glass-impregnated surface. The polished surfaces of two specimens of the same material were bonded face-to-face under clamping pressure with a thin layer (<10 μm) of superglue (Loctite, Newington, Conn.). In the case of the S-FGM the glass-impregnated surfaces of the two bars were aligned. The long surface perpendicular to the bonded interface was then polished. In the case of S-FGM this surface corresponded to the glass-impregnated surface. The newly polished surfaces of both the S-FGM bonded-interface specimen and the pure alumina specimen were indented symmetrically across the surface trace of the interface. A tungsten carbide cobalt (WC-Co) sphere of radius 4.76 mm was used as the indentor (E=614 GPa, v=0.22). The indentation load was 300 kg. Indentation was carried out in a universal mechanical testing machine (Instron, Canton, Mass.). The contact radii, a, for the alumina and the S-FGM were measured to be 0.3597 nm and 0.3895 mm, respectively. After indentation, the two halves of the indented bonded-interface specimens were separated by dissolving the superglue in acetone, cleaned, gold-coated, and viewed in an optical microscope. The results are shown in FIGS. 10–11, which are photocopies of the microscope images. FIG. 10 is the alumina sample showing cracking, and FIG. 11 is the S-FGM material showing resistance to cracking. In the pure alumina control we observed classical Hertzian cone cracks, approximately 1 mm long. In the S-FGM there was no evidence of any cone cracks or damage beneath the contact circle.

Example 3

Finite Element Modeling

The indentation loading conditions and the elastic properties of the S-FGM, the alumina and the WC-CO indentor described in Examples 1 and 2 were used as input into a finite element model. The results from this model clearly show that in the case of S-FGM the maximum tensile Hertzian stress is about 17% lower than that in pure alumina control, under the same indentation loading conditions. Furthermore, the decrease in the maximum tensile Hertzian stress in the S-FGM relative to that in pure alumina control is predicted to be even more dramatic with increasing indentation loads, above 300 kg.

Note that the above-observed prevention of Hertzian cone-crack formation in S-FGM is not due to the traditional approaches known in the art. This is because the glass chosen here has a thermal expansion coefficient identical to that of alumina=$8.8 \times 10^{-6\circ}$ $C.^{-1}$, thereby precluding any possibility of macroscopic residual compressive stresses on the surface. Also, unlike heterogeneous ceramics, zone of distributed shear faults beneath the contact circle was not observed in indented S-FGM.

Like alumina, grain boundaries in most ceramics including oxides, mixed oxides, nitrides, carbides, silicides, to name a few, can be penetrated by molten glasses of appropriate compositions (see Clarke, "On the Equilibrium Thickness of Intergranular Glass Phases in Ceramic Materials" *J. Am. Ceram. Soc.* 70, 1, 15–22 (1987)). Therefore, the method of making S-FGM in order to prevent Hertzian cone cracking in brittle materials outlined in this invention (FIGS. 4–6) has broad applicability to most available ceramics.

This approach outlined in this invention presents a radically new and easy way of preventing Hertzian cone-crack formation in brittle materials subjected to Hertzian indentation. Therefore, this invention has potentially broad implications on applications such as structural parts, microelectronic parts, dental materials, prosthesis, concrete, to name a few, in which brittle materials are extensively used. Most importantly, the approach outlined in this invention relies on a purely elastic phenomenon and is, therefore, inherently immune to fatigue-related degradation.

B. Sliding Contact Stress Resistance

Example 4

Surface Functionally-Graded Articles Designed to Withstand Sliding Contact Stress-General Discussion This example will demonstrate that materials with a controlled elastic gradient generate less tensile stresses compared to the homogenous, homogenous, homogenous form of the same material. Consequently, these graded materials have enhanced sliding contact stress (sliding wear) resistance. Stress analysis, by the finite element method, of the 2-D cylinder and the spherical indentor case will be presented. Experimental results of a rigid spherical indentor sliding on a graded and homogenous material are presented in Example 5. In all the following studies, the graded material is alumina-glass, as described in Example 1. This material is an ideal model elastic graded system without any long range internal stresses, where the gradient in the elastic modulus is 50% over a thickness of 2 mm. The homogenous form of this graded material is pure alumina (Young's modulus is 240 GPa and Poisson's ratio is 0.22).

Figure 26:
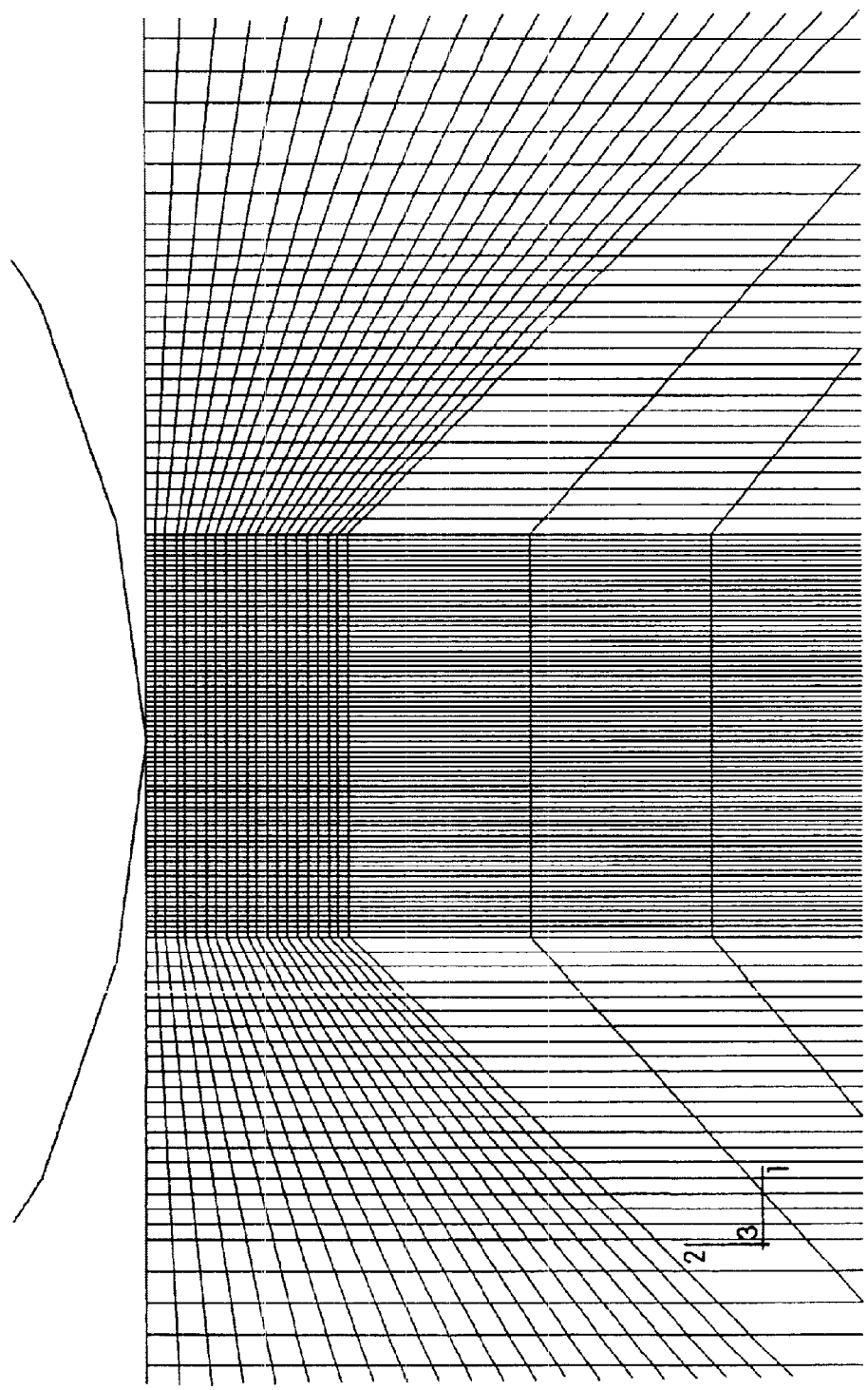
FIG. 26 is a finite discretization for a cylinder on a plane surface.
Figure 27:
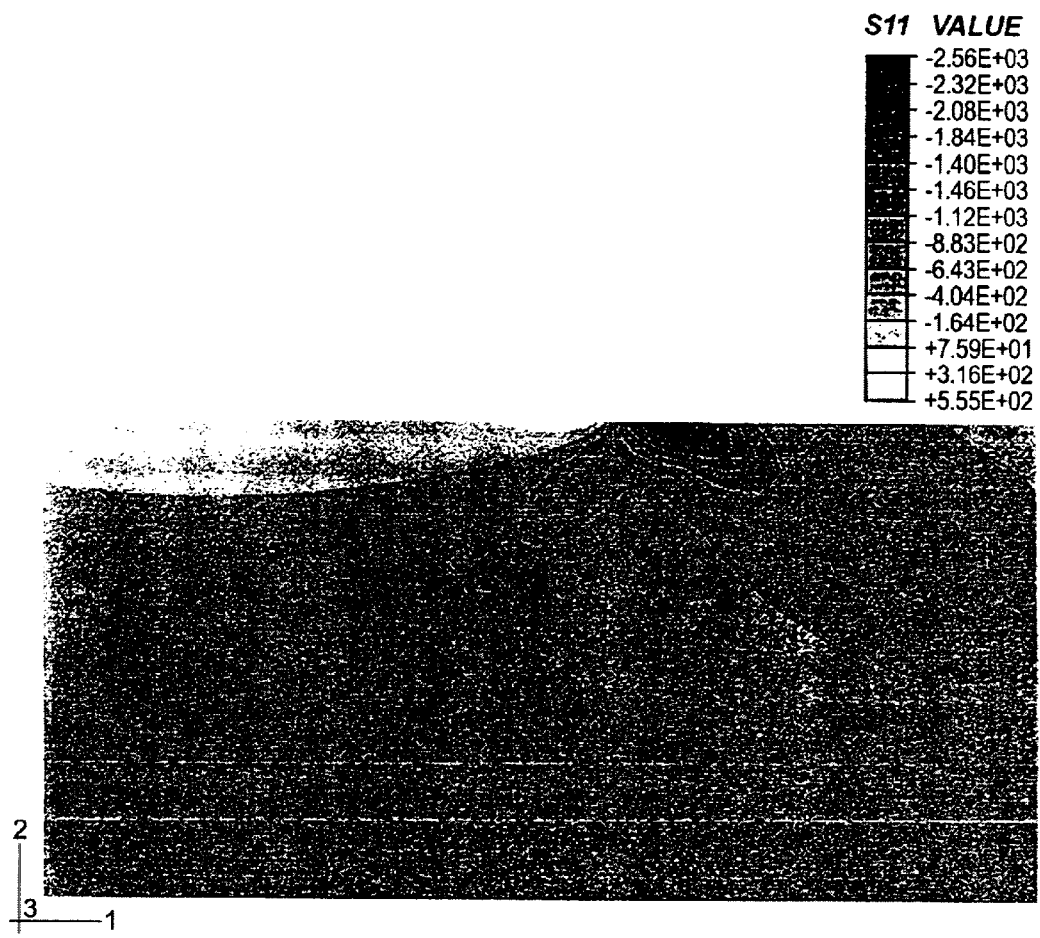
FIG. 27 shows computer simulation of tensile stresses beneath the surface of a cylindrical indentor on a plane surface of homogenous alumina.
Figure 28:
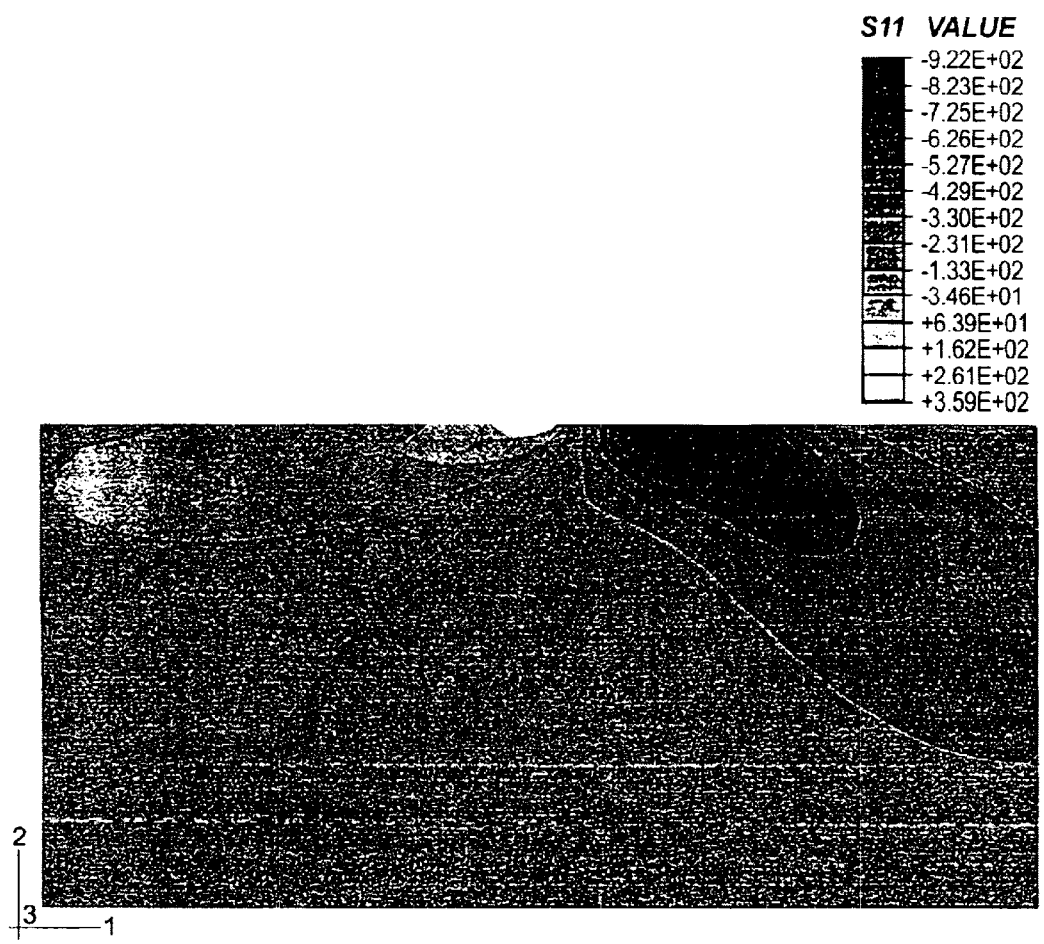
FIG. 28 is a computer simulation of tensile stresses beneath the surface of a cylindrical indentor on a plane surface of graded alumina-glass.

FIG. 26 shows the numerical finite element discretization used to evaluate the sliding resistance of homogenous alumina and graded alumina-glass. The finite element package ABAQUS 5.5 (HKS, Pawtucket, USA) was used for modeling. The cylindrical indentor is assumed to be rigid. A normal load of 1000 N was applied and a tangential displacement imposed on the indentor with a dry coefficient of friction equivalent to 0.35. Contact is achieved by kinematic constraints that prevent interpenetration of the contacting surface. Coulombic friction is introduced into the model via a critical shear stress parameter that must be less than the equivalent shear stress for slip to occur. The rigid surface is idealized as a Bezier surface with unique contact constraints at each point on the surface. In the 2-D case, the principal invariant is the tangential stress (given as s11 in FIG. 27 and FIG. 28. FIG. 27 shows that the tensile stresses in homogenous alumina occurs at the trailing edge (wake) of the indentor and just below the material surface. The maximum tensile stress is 555 MPa. Under the same conditions, FIG. 28 shows the maximum tensile stress for graded alumina-glass, which is 359 MPa or 35% lower than in homogenous alumina. Qualitatively, the maximum tensile stress extends to a significantly smaller portion of the surface at the wake in the graded materials compared to homogenous alumina. Therefore, in graded materials, tensile stresses are retained at shallower regions beneath the surface. This shows that the volume of material that experiences high tensile stresses is smaller and is only influential in a shallower region in graded alumina-glass compared to homogenous alumina. Consequently, the resistance to sliding wear is higher in graded materials compared to their homogenous counterparts. The contact pressure generated in the graded material is two times lower than in homogenous alumina. Under conditions of very small scale sliding, this property of the graded material improves its wear resistance.

Figure 29:
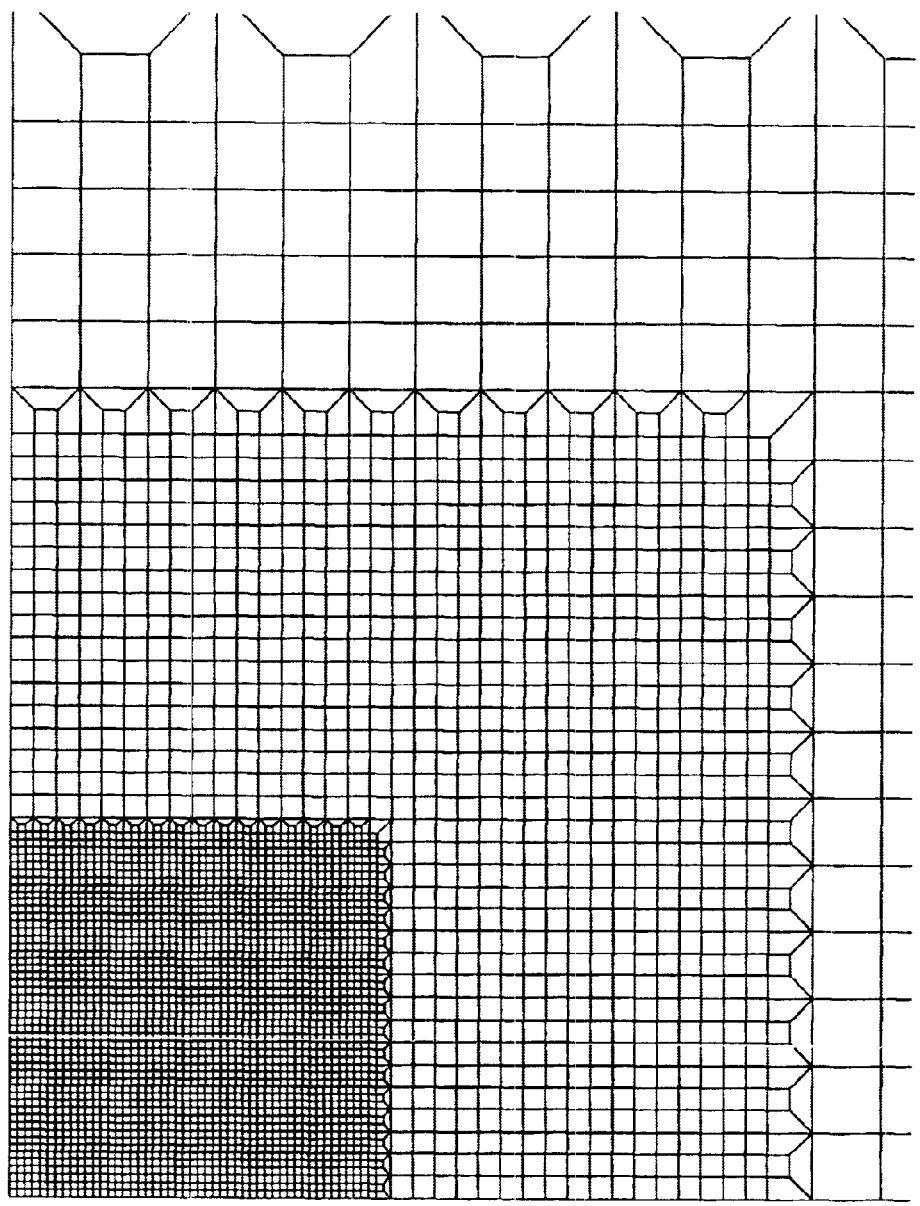
FIG. 29 is a finite discretization for a sphere on a plane surface.
Figure 30:
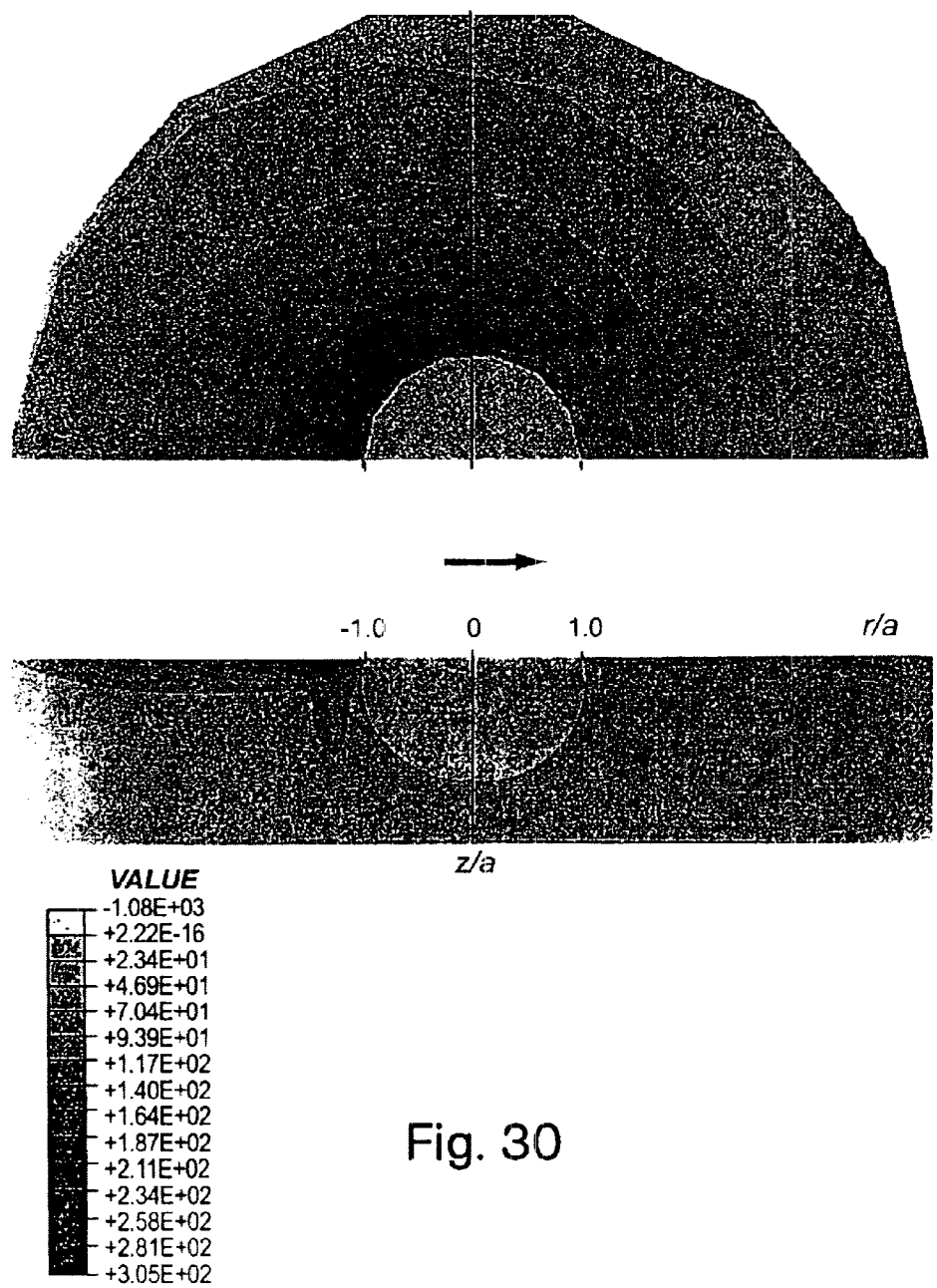
FIG. 30 is a computer simulation of tensile stresses beneath the surface of a spherical indentor on a plane surface on homogenous alumina.
Figure 31:
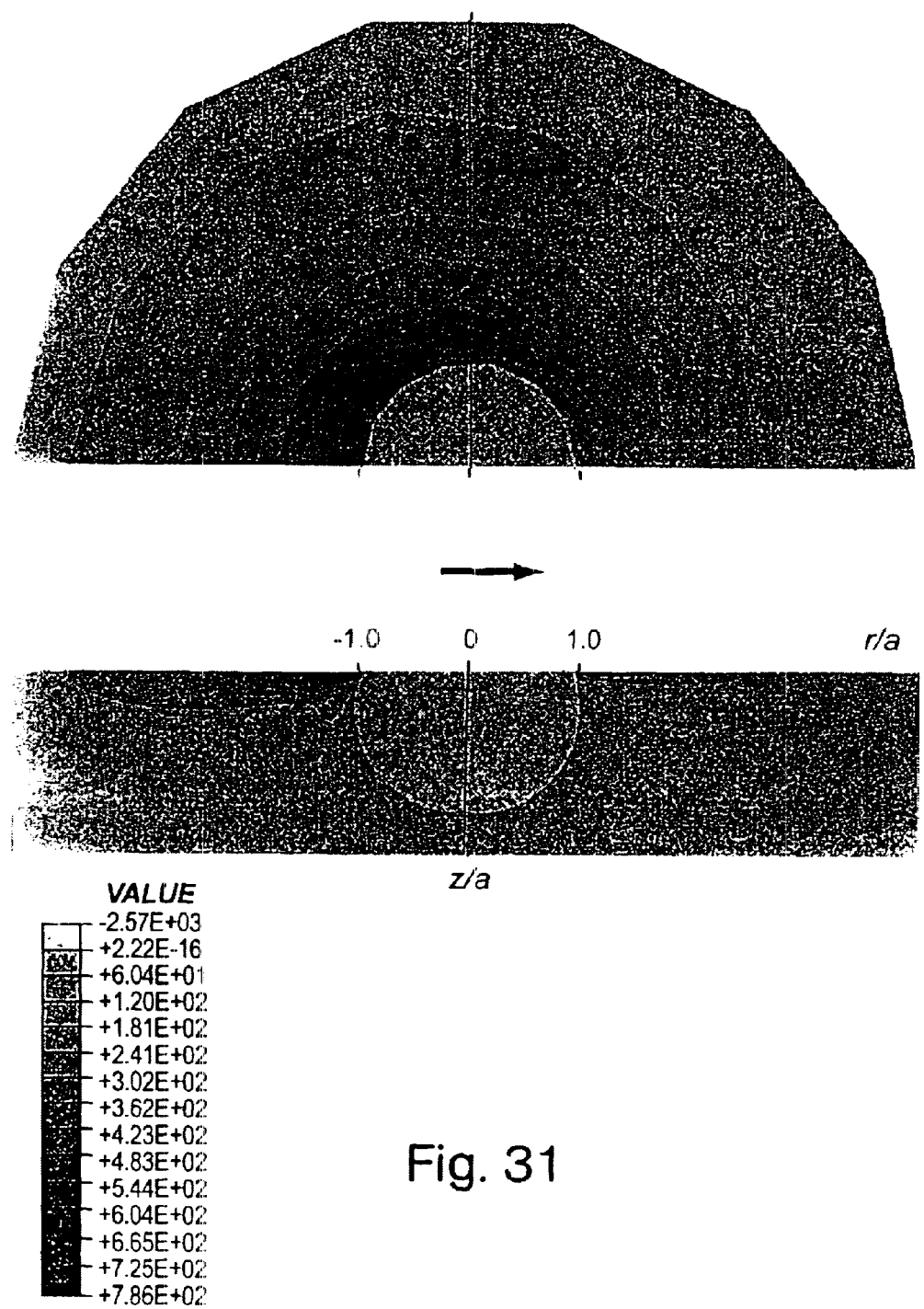
FIG. 31 is a computer simulation of tensile stresses beneath the surface of a spherical indentor on a plane surface of a graded alumina-glass.

Finite Element Computations of a Sphere Sliding on Alumina and Graded Alumina-Glass In this analysis, a three dimensional finite element formulation was used. FIG. 29 illustrates the three dimensional numerical finite element discretization used to compare the sliding resistance of graded alumina-glass and homogenous alumina. Modeling was executed by imposing conditions similar to the sliding experiments detailed in Example 5. FIG. 30 shows the finite element predictions of the contours of constant tensile principal stresses for the sliding indentation of a rigid sphere on alumina. FIG. 31 shows the finite element predictions of the contours of constant tensile principal stresses for the sliding indentation of a rigid sphere on graded alumina-glass. By comparing these two figures, the strength due to sliding contact of graded alumina-glass is 26% higher than in homogenous alumina. The introduction of a gradient in elastic properties suppresses the maximum principal tensile stress by 26%. The maximum tensile stress extends to a significantly smaller potion of the surface at the wake in the graded materials compared to homogenous alumina. In graded materials, tensile stresses are also retained at shallower regions beneath the surface. This shows that the volume of material that experiences high tensile stresses is smaller and is influential in a shallower region in graded alumina-glass compared to homogenous alumina. Consequently, the resistance to sliding wear is expected to be higher in graded materials compared to their homogenous counterparts.

Example 5

Figure 32:
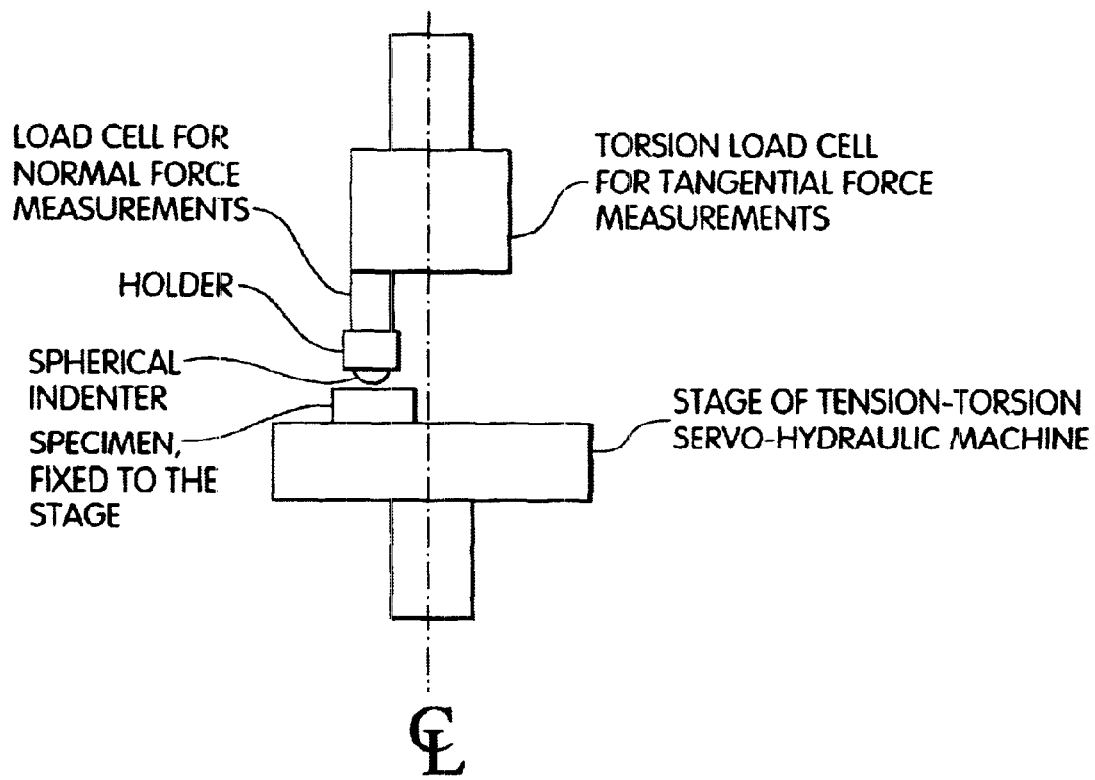
FIG. 32 is a schematic illustration of a tension-torsion machine.
Figure 33:
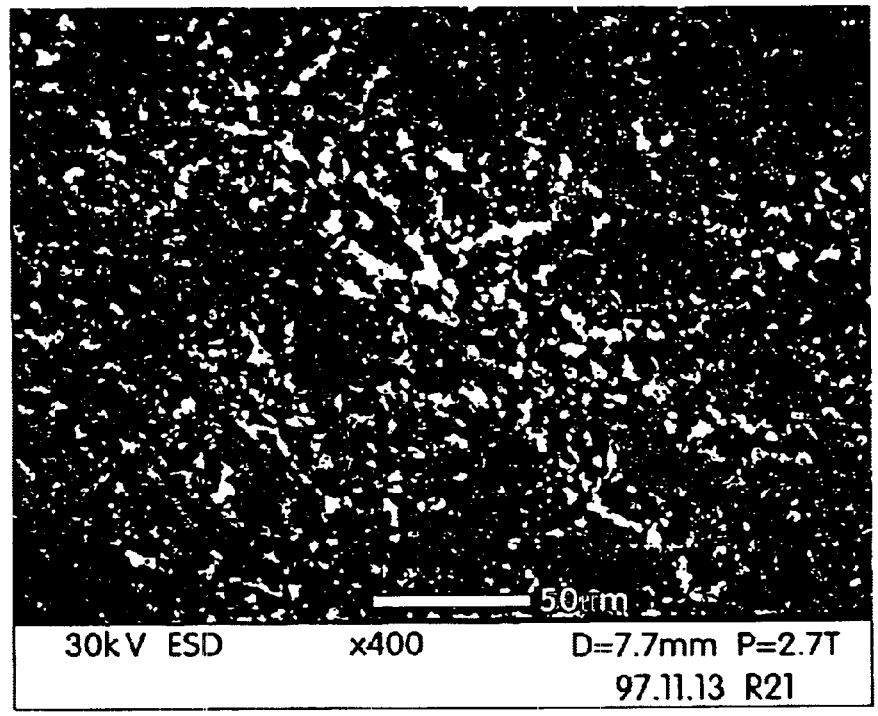
FIG. 33 is a photocopy of an SEM image of thin cracks on a graded alumina-glass surface.
Figure 34:
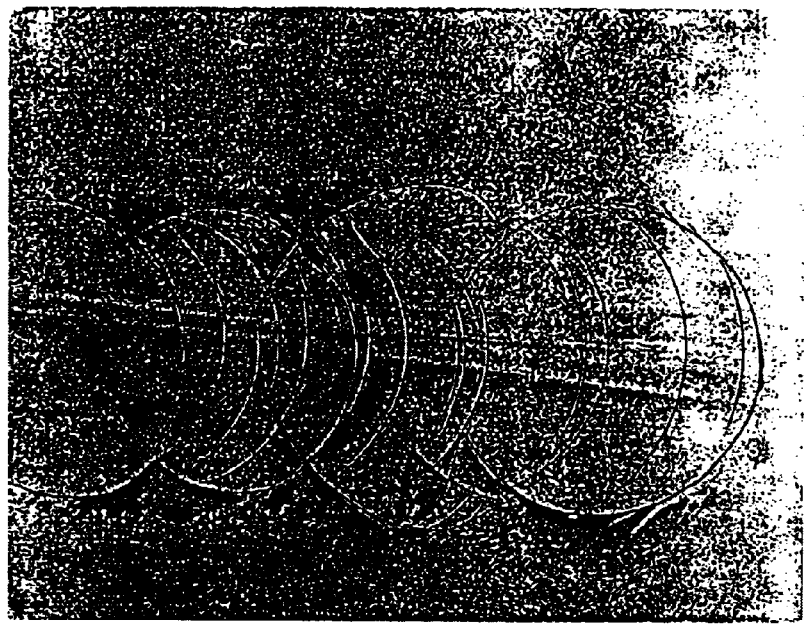
FIG. 34 is a photocopy of a optical microscope image of a herringbone crack on monolithic glass.
Figure 35:
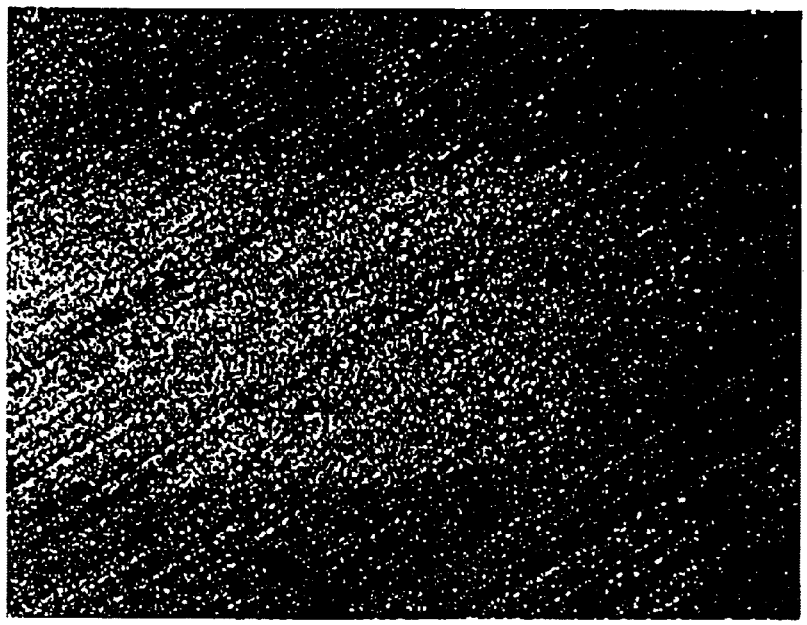
FIG. 35 is a photocopy of an optical microscope image of a surface of graded alumina-glass of the invention.

Experimental Examination of Resistance to Sliding Contact Stress by Materials Having Functionally-Graded Surfaces The objective of this example is to ascertain the critical normal load for the onset of surface cracks in graded alumina-glass and homogenous alumina in the wake of a sliding spherical indentor. The experimental set-up is shown in FIG. 32 and is designed to accomplish the above objective under dry sliding conditions. A hardened steel spherical indentor was used in all cases. The diameter of the indentor was 20 mm with a Young's modulus of 208 GPa and a Poisson's ration of 0.3. All tests were performed using a MTS servo-hydraulic tension/torsion machine where the vertical and angular positions were controlled independently by two INSTRON 8500+ control units. The contact point was chosen to be 82.5 mm away from the center line of the machine and sliding contact was achieved by changing the angular position of the machine stage. With this procedure, the sliding track followed a circular arc. In each test, the normal contact load was first applied and subsequently remained constant. Thereafter, a tangential load was applied by controlling the sliding displacement of the spherical indentor by the torsional angular rotation of the stage. Since the sliding velocity was less than 0.3 mm/s, the results of these experiments were quasi-static. The arc length of the sliding track was about 1.5 mm. For alumina, the critical normal load was found to be 1600N with a corresponding maximum tensile stress of 1310 MPa. At this load, alumina failed catastrophically. Under the same conditions, the critical load at the onset of surface cracks in the graded alumina-glass material was 2200N, approximately a 38% increase in critical load. At a critical load of 2300N, small cracks can be observed in FIG. 33 at the trailing edge of the indentor. These cracks are only visible at high magnification (using a scanning electron microscope). These cracks were thin and indicate that crack formation in graded alumina-glass does not lead to catastrophic fracture as in the case of alumina. Since the failure of alumina was catastrophic, a separate sliding indentation experiment was performed on homogenous glass. It can be observed in FIG. 34 by optical microscopy, that the critical load (800 N) for the onset of surface cracks induces the classical "herring bone" crack formation. At load that is three times higher, cracks are barely visible in the graded alumina-glass material (see FIG. 35). This is further evidence of the capability of the graded material to suppress crack formation by lowering the tensile stresses induced during sliding.

Discussion of Examples of 4 and 5

The lower tensile stresses immediately below a sliding indentor in graded alumina-glass compared to homogenous alumina show that a controlled gradient in elastic modulus enhances the sliding wear performance (sliding contact stress resistance) of a material. It was determined that reductions up to 35% in the maximum tensile stresses can be achieved in this type of grading scheme. In experiments on a spherical indentor sliding on a plane surface, the critical load for the formation of surface cracks due to sliding was about 1.4 times higher in graded alumina-glass compared to homogenous alumina and nearly a factor of three higher compared to glass. Computational and experimental studies demonstrate that a wide class of articles that traditionally suffer from sliding wear during service can have significantly improved sliding wear resistance if at least one of the bearing surface is graded in its elastic modulus.

TABLE 1

Material combinations on the surfaces constructed and arranged to withstand sliding contact stress, such as bearing surfaces of biomedical prostheses, *UHMWPE=ultra high molecular weight polyethylene

| Biomedical Prostheses | Bearing Surface "A" | Bearing Surface "B" |
|---|---|---|
| ball-socket, sliding joint, articulating surfaces | alumina | graded alumina-glass |
| ball-socket, sliding joint, articulating surfaces | graded alumina-glass | alumina |
| ball-socket, sliding joint, articulating surfaces | Ti or Ti-6Al-4V | graded Ti or Ti-6Al-4V |
| ball-socket, sliding joint, articulating surfaces | graded Ti or Ti-6Al-4V | Ti or Ti-6Al-4V |
| ball-socket, sliding joint, articulating surfaces | alumina or partially stabilized zirconia | graded UHMWPE* |
| ball-socket, sliding joint, articulating surfaces | graded UHMWPE | alumina or partially stabilized zirconia |
| ball-socket, sliding joint, articulating surfaces | partially stabilized zirconia | graded partially stabilized zirconia |
| ball-socket, sliding joint, articulating surfaces | graded partially stabilized zirconia | partially stabilized zirconia |
| ball-socket, sliding joint, articulating surfaces | graded partially stabilized zirconia | alumina |
| ball-socket, sliding joint, articulating surfaces | alumina | graded partially stabilized zirconia |
| ball-socket, sliding joint, articulating surfaces | stainless steel or cobalt chromium | graded stainless steel or cobalt chromium |
| ball-socket, sliding joint, | graded stainless steel or | stainless steel or cobalt |

TABLE 1-continued

Material combinations on the surfaces constructed and arranged to withstand sliding contact stress, such as bearing surfaces of biomedical prostheses, *UHMWPE=ultra high molecular weight polyethylene

| Biomedical Prostheses | Bearing Surface "A" | Bearing Surface "B" |
|---|---|---|
| articulating surfaces | cobalt chromium | chromium |
| pins/screws/dental implants | bone/cement | graded alumina-glass or graded partially stabilized zirconia |
| pins/screws/dental implants | graded alumina-glass or graded partially stabilized zirconia | bone/cement |
| pins/screws/dental implants | bone/cement | graded-Ti or Ti-6Al-4V alloy |
| pins/screws/dental implants | graded-Ti or Ti-6Al-4V alloy | bone/cement |
| pins/screws/dental implants | graded stainless steel or cobalt chromium | bone/cement |
| pins/screws/dental implants | bone/cement | graded stainless steel or cobalt chromium |

C. Composite Laminate Articles

Example 6 (Comparative)

Three-Dimensional Elastic Analyses of Carbon-Reinforced Epoxy Laminate Stacked Conventionally To improve resistance to indentation dramatically of a material, functional dependence of the orientation of fiber axes through the thickness of the article was investigated. A discontinuous orientation distribution, as exemplified by comparative cross-ply laminate, was studied.

There is strong evidence, in the art, that failure caused by spherical indentation of a laminate composite article is initiated by tensile stresses perpendicular to the fibers. The transverse tensile strength of a typical fiber-reinforced epoxy article, containing a volume fraction of fibers of 50–65%, is in the range of $10^1$–$10^2$ MPa, whereas the tensile strength in the longitudinal direction is on the order of $10^3$ MPa. With this in mind, it is desirable to choose a lay up configuration which minimizes tension perpendicular to fibers. The present invention addresses this issue by loading the fibers so as to avoid matrix damage.

To investigate elastic indentation of a layered, anisotropic body involving many layers of different orientation, a three-dimensional analysis was carried out using the finite element method. Analytical and numerical studies on elastic indentation of isotropic materials with through-thickness gradients in Young's modulus exist (U.S. patent application Ser. No. 08/805,624, reference above). These studies show that for Young's modulus increasing monotonically and convexly with depth, the tensile stresses in the radial axial plane are generally lowered. In some cases, a functional dependence of Young's modulus can be prescribed in a relation to the Poisson ratio, which causes the components of stress to be compressive throughout the entire body. This can be of importance to the failure of these materials, since the radial/axial tension is believed to cause the formation of cone cracks which are typically found in brittle materials subjected to Hertzian indentation. In the case of a decreasing Young's modulus with depth, enhanced tension results near the surface. Given this background information, an analysis of layering of anisotropic materials with a prescribed continuous and monotonous functional dependence of the material orientation through the thickness is presented.

Elastic anisotropy of polymers reinforced with aligned continuous fibers is well-described by orthotopic constitutive material laws (e.g. Jones (1975)). In this example, the model material is an epoxy reinforced with carbon fibers. Hence, as far as linear elasticity is concerned, the constitutive relation between stresses and strains in the base material (i.e., the sublayers of the laminate which is made up of unidirectional fiber-reinforced epoxy) is known. But deriving the distributions of loads in the various lay-up configurations subjected to indentation requires the solution of three-dimensional field equations (this was done by finite elements).

The lay-up configuration that will be considered as a comparative example is that of a symmetric cross-ply laminate comprising alternating 0° and 90° fiber direction layers. This arrangement is illustrated schematically in FIG. 17, and it includes 23 alternating 0° and 90° layers of equal thickness. Each ply group consists of 4 coaligned plies giving the configuration $[0°_4, 90°_4, 0°_4, 90°_4, \ldots]_{symmetric}$. It is symmetric with respect to the midplane, i.e. the center plane of the twelfth layer. The z-axis direction dimension (overall thickness, H), of the laminate is 12.6 millimeters.

The numerical analysis, as well as experimental analysis described below, incorporates a symmetric double indentation test wherein indentation of two specimens arranged on top of each other is performed. This arrangement allows for the indentation of thick plates without bending or free edge surface boundary effects, provided that the free boundary is remote from the point of indentation. The characteristic length scales relevant to the problem are: the diameter of the indenting sphere (D) overall thickness of laminate (H), and contact radius (a). Additionally, the through-thickness inhomogeneity implies a length scale. In the case of a layered composite, it is the thickness sequence of individual ply groups ($h_n$), whereas in the case of a graded composite, it is the change in orientation per unit depth. It is understood that, for continuum analyses to be valid, all of the above lengths should be at least an order of magnitude larger than the fiber diameter (approximately 7 microns).

Constitutively, the material of an individual layer can be considered to be a homogeneous anisotropic material with special transverse isotropy. Note that here transverse isotropy means that the material is isotropic within a cross-section which is perpendicular to the fibers. This means that the linear elastic behavior of each layer is established through five independent material constants, namely Young's modulus along the fiber axis ($E_L$), the normalized transverse modulus $E_T/E_L$, the normalized shear modulus $G_{LT}/E_L$, and the two Poisson ratios $v_{LT}$ and $v_{TT}$. $v_{TT}$ denotes the Poisson ratio within the transverse isotropic plane and $v_{LT}$ is defined as the relative transverse contraction strain when subject to uniaxial tension in the fiber direction. Within the context of an elastic formulation, these five constants completely characterize the material response irrespective of the particular combination of material and fiber material choice or fiber content. The material data used for the analysis was: $E_L$ (GPa)=120; $E_T$ (GPa)=7.7; $G_{LT}$ (GPa)= 3.72; $v_{LT}$=0.33; $v_{TT}$=0.45.

Since strength and failure are important issues in indentation, examination was focused on tensile stresses perpendicular to fibers.

Figure 17:
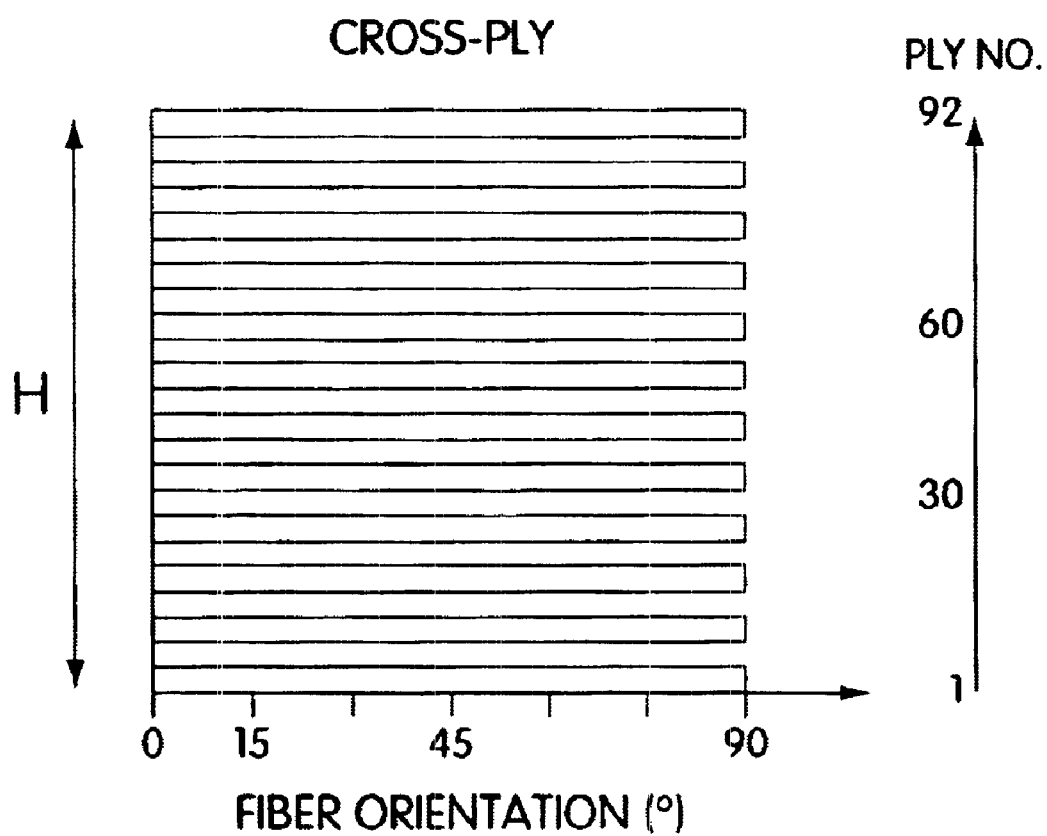
FIG. 17 is a schematic illustration of a prior art, cross-ply fiber-reinforced laminate article.
Figure 18:
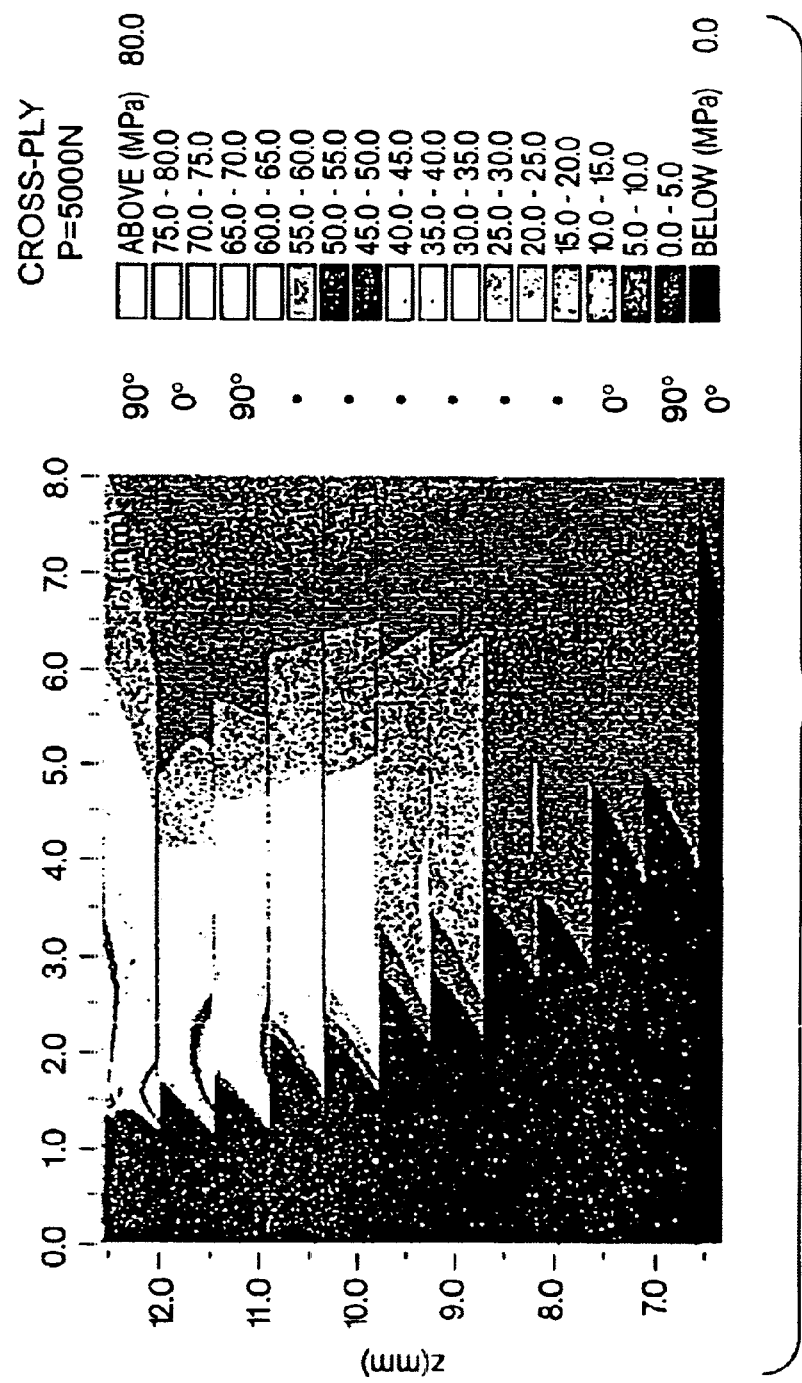
FIG. 18 shows maximum tensile stresses perpendicular to fibers in accordance with a theoretical indentation of a prior art laminate arrangement.

FIG. 18 shows the results of the finite element analysis of indentation of the material of FIG. 17 by a spherical steel ball of diameter ⅝", corresponding to an overall indentor force of 5,000 N. Stress concentrations are present at the interfaces between layers of dissimilar orientation. The highest level of tension is found in the uppermost interfaces. Stress concentrations are located in the layers below as well. Note that the stress amplitude decreases markedly with depth. In the upper two interfaces the tensile stress perpendicular to fibers exceeds the strength of the material, which is well above the strength of 80 MPa transverse to fibers, hence failure is expected at these sites. The maximum tension perpendicular to fibers occurs in the transverse planes of symmetry. The tensile stresses therefore are on the principal plane.

Example 7

Three-Dimensional Elastic Analysis of Graduated Fiber Article

An analysis was performed as in Example 6 with a continuous linear or step-wise variation of fiber orientation through thickness.

Figure 19:
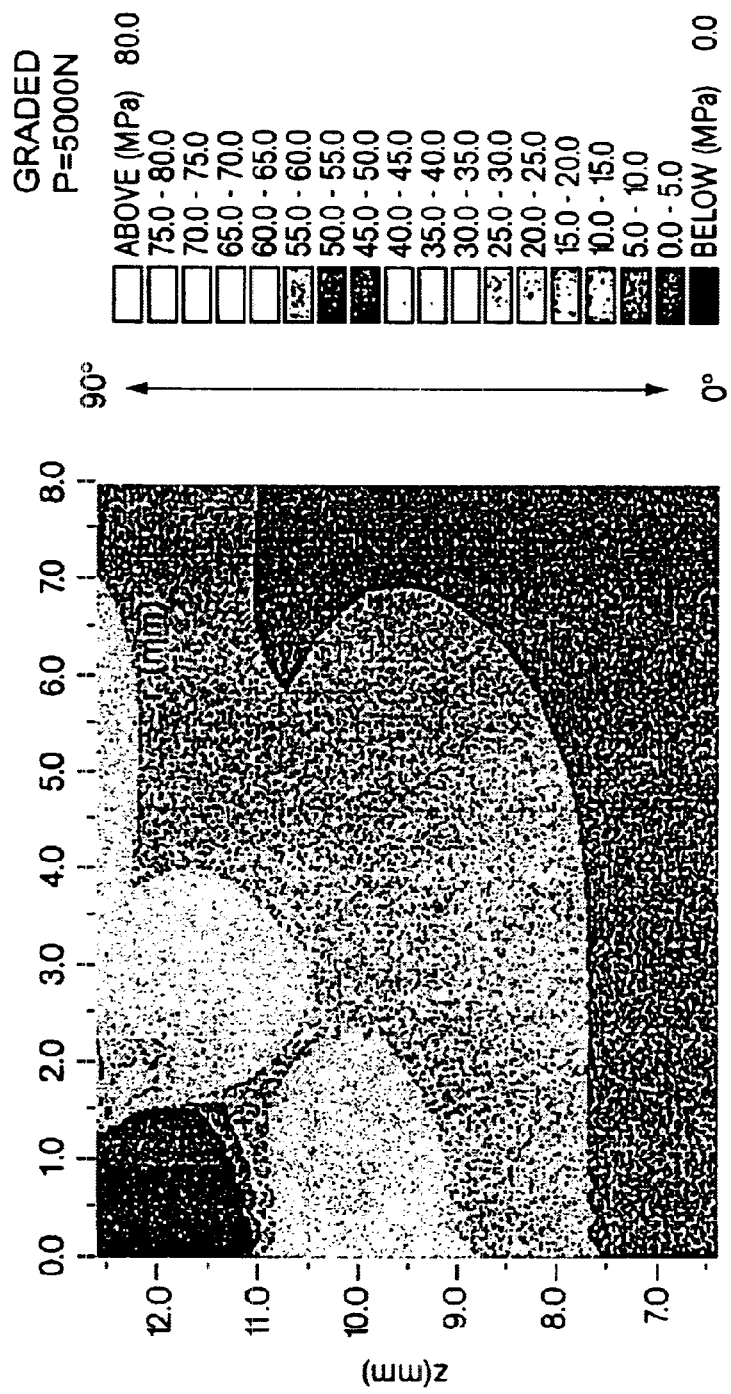
FIG. 19 shows maximum tensile stresses perpendicular to fibers of an ideal, continuous gradient variation of fiber orientation in a fiber-reinforced laminate article.

Computations were carried out assuming a continuous gradient variation of fiber orientation. Specifically, for this example, a laminate article included 92 layers of material, as in Example 6, but was oriented with a continuous linear change of fiber orientation from 90° at the topmost surface to 0° at the center plane (a plane of symmetry of the plate), and then continuing at equal intervals of rotational orientation to the bottom layer back to 0° stacking [0°, 2°, 4°, ... 86°, 88°, 90°]$_{symmetric}$. The overall thickness of the plate, as in the plate of Example 6, was 12.6 millimeters. Calculated load was applied incrementally, reaching a maximum of 5,000 N. The distribution of maximum tensile stresses perpendicular to fibers corresponding to this load level is depicted in FIG. 19. In this particular case contact is achieved within a radius of 1.4 millimeters. As can be seen from FIG. 19, a far more indentation-tolerant material results from the gradation in fiber orientation in the case of the graded material stresses diffuse, hence for the same level of loading the stress amplitude is reduced below the critical level by a factor of two.

Figure 20:
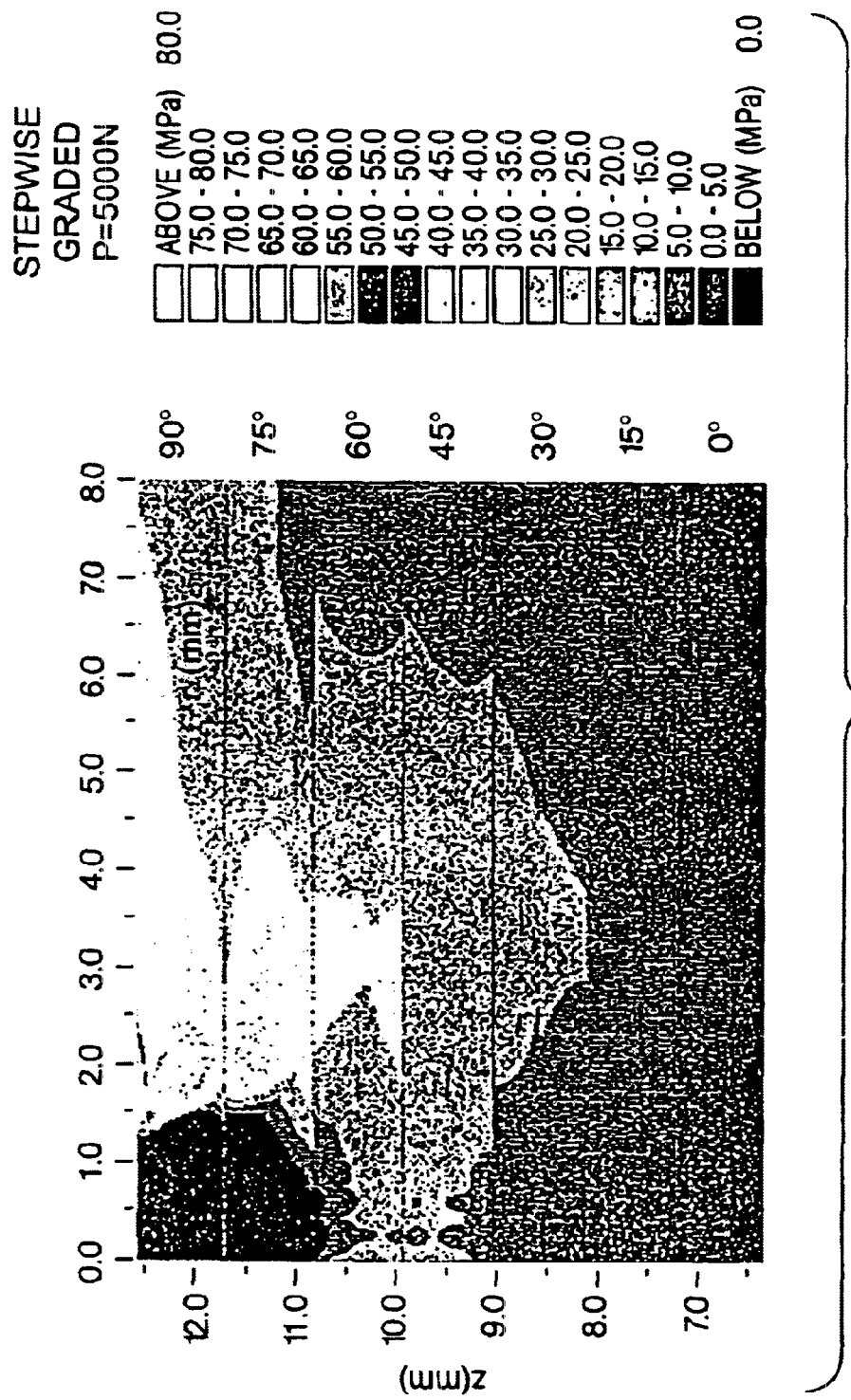
FIG. 20 shows maximum tensile stresses perpendicular to fibers for a theoretical stacked array of fiber-reinforced laminate plies of the invention each offset by 15° with respect to the preceding ply.

Similar computations were carried out assuming a step-wise variation of fiber orientation, approximately as indicated in FIG. 12, with 15° offset between each layer. A theoretical experiment was carried out as defined above. A distribution of maximum tensile stresses perpendicular to fibers corresponding to the load level of 5,000 N is depicted in FIG. 20. A far more indentation-tolerant material results, relative to the 0°, 90° ... lay-up of Example 5 (FIG. 18). Indentation tolerance was much closer to the ideal, continuous gradient variation in fiber orientation described above and shown in FIG. 19.

Example 8 (Comparative)

Indentation Testing of Conventional Laminate Article

A cross-ply laminate was manufactured comprising 92 laminae, arranged in 23 groups of four. The stacking sequence can be written as: [90°$_4$, 0°$_4$, 90°$_4$, 0°$_4$, 90°$_4$, 0°$_4$, 90°$_4$, 0°$_4$, 90°$_4$, 0°$_4$, 90°$_4$, 0°$_2$]$_{symmetric}$. The laminate was made from standard carbon fiber reinforced epoxy prepregs, denoted by the commercial name Sigrafil™ obtained from SIGRI, Germany. The overall thickness of the plate was 12.6 millimeters. Hence, in average each cured laminae was approximately 137 microns in thickness.

60 mm×60 mm plates were cut. The specimens then were gently ground on the top and bottom surfaces using 500 grade paper mounted on a water-lubricated metallographic disk, in order to prepare co-planar surfaces for mounting in the double-indentation fixture by removing excess epoxy from the surfaces.

Two specimens were placed on top of each other and mounted in a double indentation fixture to test their resistance to contact loading. The specimens were oriented in order to preserve the mid-plane symmetry of the test. Load was applied using an Instron 8501 servohydraulic testing machine. The machine was operated under load control. Load is applied in all cases at a rate of 30 N/s. Three tests were conducted. The final loads were 4,000 N, 6,000 N, and 10,000 N. Loading and unloading paths were recorded for all tests. After testing, the compliance of the loading system was measured by applying force, while the two spherical indentors were in direct contact, to determine the contribution of system compliance to the overall test results.

Tested specimens were sectioned and transverse sections were ground and polished with one micron diamond paste. The polished sections were investigated using light microscopy, as well as scanning electron microscopy (SEM). SEM was performed in an environmental scanning electron microscope (ESEM), fabricated by Electroscan.

Figure 21:
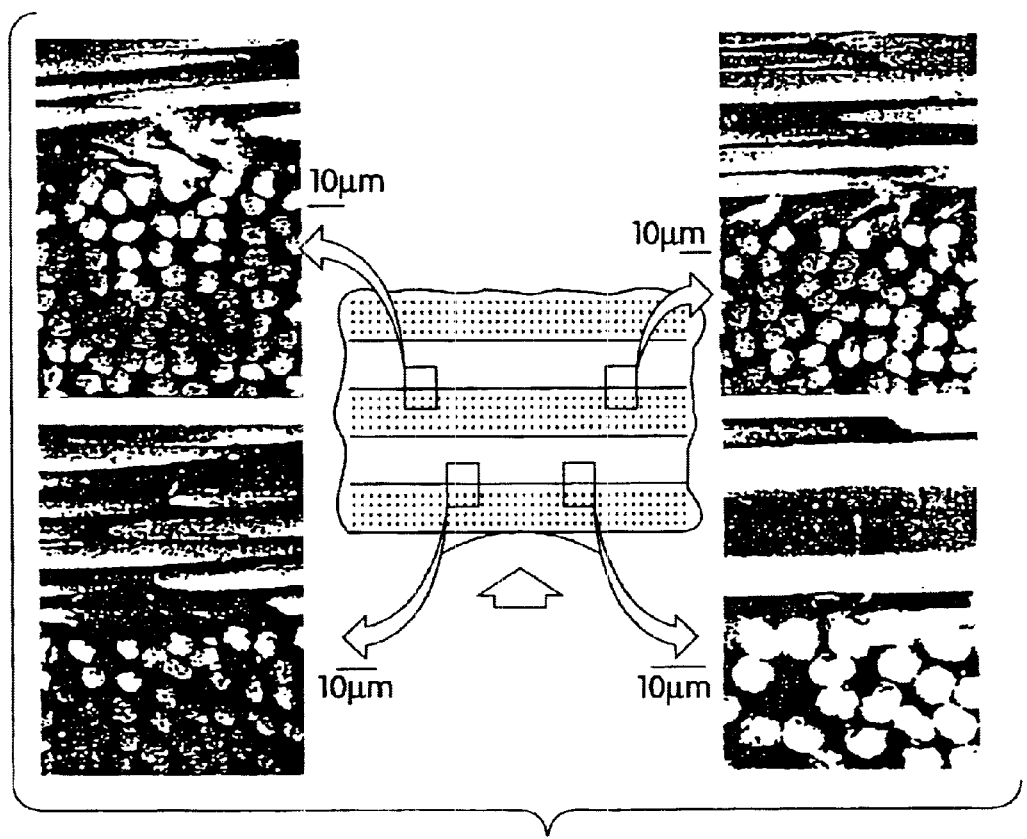
FIG. 21 is a photocopy of SEM images of a cross-section of prior art, cross-ply, fiber-reinforced laminate subjected to high indentation load and exhibiting initiation of failure in the form of microcracks.

FIG. 21 is a photocopy of a scanning electron micrograph of cross-sections of the tested conventional material. The exposed section is parallel to fibers in 90° layers and includes the axis of loading. The image revealed details of the indentation failure pattern on either side of the axis of loading. The exposed material has been subjected to 6,000 N indentation. At this load level failure is expected in the 2–3 uppermost interfaces as per the analysis of FIG. 18. Microscopy indeed reveals inclined cracks in the upper three interfaces (FIG. 21). The size of the cracks is of the order of a fiber diameter. The cracks show mirror symmetry with respect to the loading axis. The mirror symmetry applies to the position of the microcracked zone as well as the crack inclination.

Example 9

Indentation Testing of Composite Article of the Invention

A laminate article was fabricated and tested as in Example 8, but the article included a graded linear variation through thickness. The laminate included 92 laminae, each layer offset by two degrees relative to the adjacent layer. The stacking sequence was: [90°, 88°, 86°, 84° ... , 6°, 4°, 2°, 0°]$_s$ Testing was carried out as described above in Example 8.

Figure 22:
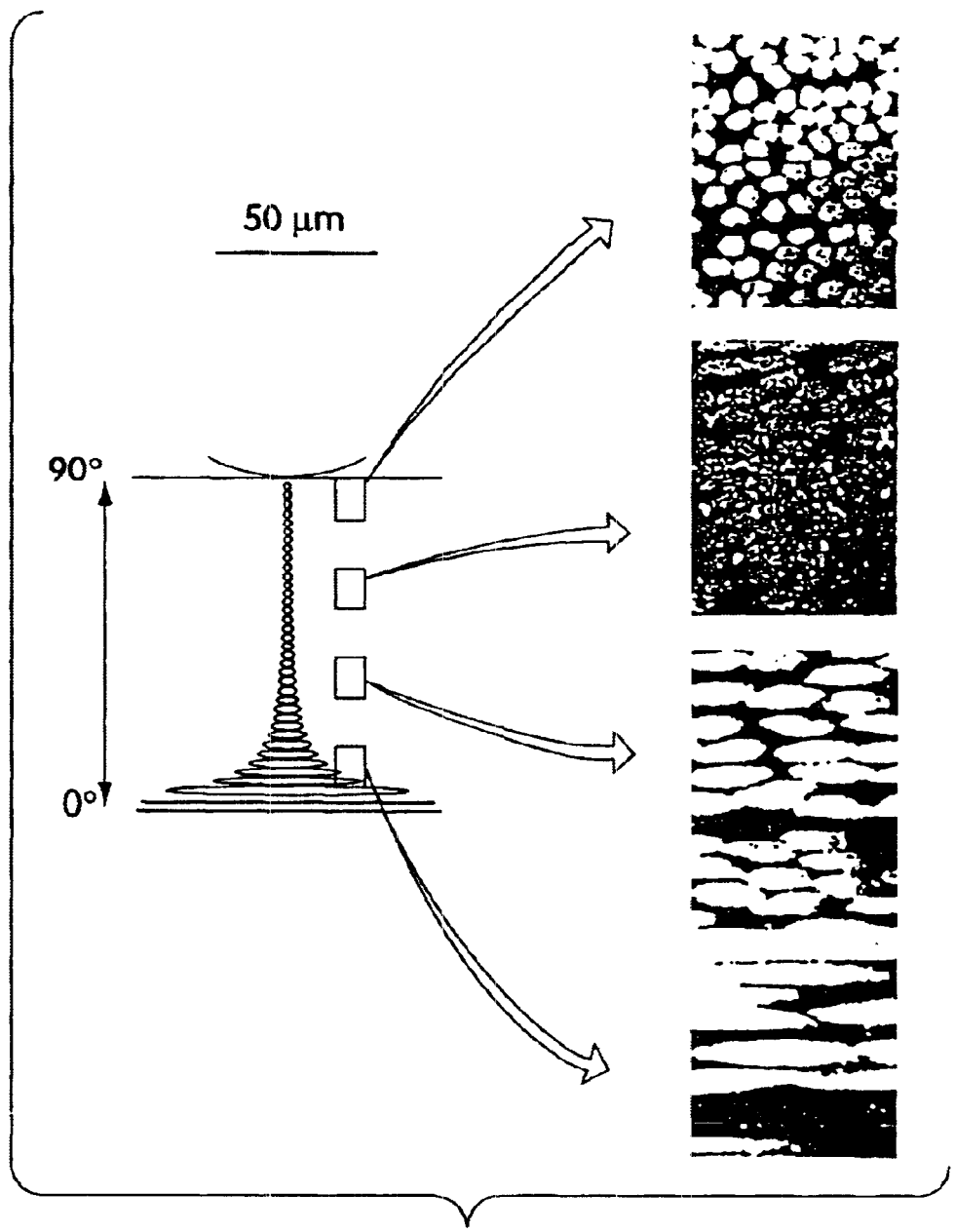
FIG. 22 is a photocopy of SEM images of a graded fiber-reinforced laminate article stacked with gradual fiber orientation change in each layer in accordance with the invention, to which high load had been applied, showing lack of material failures (absence of microcracks)
Figure 23:
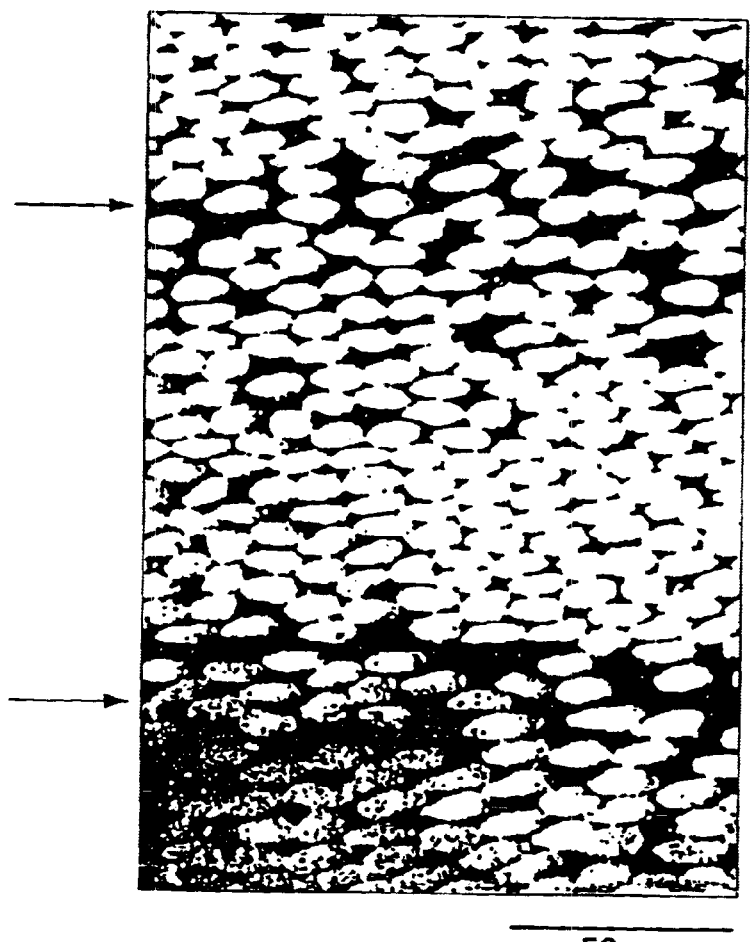
FIG. 23 is a photocopy of an SEM image of the material of FIG. 22, showing lack of failure at interfacial zones between plies.

It was not possible to identify any contact damage such as microfracture or other failure in this material, as indicated by FIG. 22, a photocopy of an ESEM image of a cross-section of the tested graded material. Fraction of a cross-section of the sample tested at 10,000 N is shown in FIG. 23 (photocopy of SEM; note the elliptic section with the front plane of each individual fiber as it changes orientation with depth.) Microscopy reveals the interfacial zones between plies as zones of relatively low fiber density (arrows of FIG. 23). These zones are spaced through the plate at a distance corresponding to laminae size, i.e. approximately 140 microns. There are no signs of contact damage such as cracking in this resin-rich region having been subjected to severe stresses.

Summary of Composite Laminate Examples

Comparison Between Experiment and Theory

Figure 24:
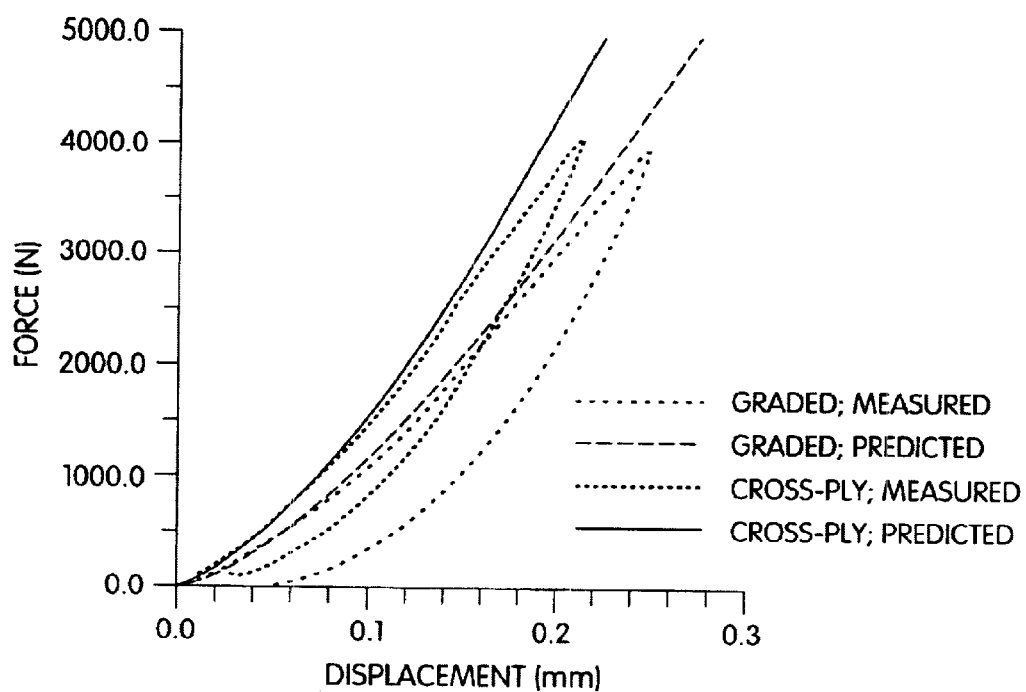
FIG. 24 shows force-depth curves for laminate articles to which load has been applied, for simulated and measured examples.

Simulated and measured force-depth curves for the laminated materials (Examples 6–9) are plotted in FIG. 24. For both materials, the prediction based on the elastic analysis is close to the actual measured response for loading. The graded orientation results in a significant increase in compliance compared to the indentation of the cross-ply laminates. The increase in compliance, as well as the stress distribution and amplitude together suggest a more indentation resistant response, as compared to the cross-ply laminate. For the cross-ply laminate a distinct loss in stiffness is found experimentally for the load of approximately 2,800 N, where a kink in the measured force-depth response is seen. The kink is believed to arise from the onset of delamination. Above this load, the slope of the force-depth response is markedly softer than the predicted elastic response. The force-depth response for the graded material does not show a similar discontinuity in slope. The hysteresis of the graded material is, however, significant and even more pronounced than for the cross-ply laminate. Hence, the energy dissipation during the loading cycle is higher for the graded material than for the cross-ply laminate. The fact that the measured force-depth relation does not show any discontinuity in slope almost excludes the possibility of localized micro-delamination taken place during indentation. Delamination does involve a drop in shear stiffness of the structure, and will cause a softening in the force-displacement curve. The absence of a discontinuity of the force-depth response indicates that the hysteresis and dissipation of energy in the graded material is likely to be due to a deformation mechanism which is continuously distributed in the volume of material. Note also that contact friction can contribute to the measured response and that for fixed load, this contribution is expected to be higher for the graded material than for the cross-ply laminate, due to the larger contact area achieved in the former material.

Those skilled in the art would readily appreciate that all parameters listed herein are meant to be exemplary and that actual parameters will depend upon the specific application for which the methods and apparatus of the present invention are used. It is, therefore, to be understood that the foregoing embodiments are presented by way of example only and that, within the scope of the appended claims and equivalents thereto, the invention may be practiced otherwise than as specifically described.

What is claimed is:

1. An article for resisting indentation against its surface, comprising: a stacked array, having a surface, of at least five layer units each having a principle axis of anisotropy, each unit having an adjacent unit and the principle axis of anisotropy of each unit being offset from that of a unit to which it is adjacent by less than 45°, wherein the offset in principle axis of anisotropy of each succeeding layer differs consistently in offset direction from each preceding layer, the article forming part of a construction constructed and positioned to withstand indentation having a component normal to a tangent of the surface.

2. An article as in claim 1, wherein the stacked array is a laminate composite.

3. An article as in claim 1, wherein the stacked array is an array of essentially linear, parallel fibers imbedded in a matrix, each unit having an adjacent unit offset in principle axis of anisotropy by less than 45°.

4. An article as in claim 3, wherein the stacked array is an array of stacked fiber-reinforced polymeric plies.

5. An article as in claim 4, wherein the stacked array is an array of stacked carbon fiber-reinforced polymeric plies.

6. An article as in claim 5, wherein the stacked array is an array of stacked fiber-reinforced epoxy plies.

7. An article as in claim 2, wherein the stacked array is an array of stacked fiber-reinforced epoxy plies.

8. An article as in claim 1, wherein each unit has an adjacent unit offset in principle axis of anisotropy by less than about 35°.

9. An article as in claim 1, wherein each unit has an adjacent unit offset in principle axis of anisotropy by less than about 25°.

10. An article as in claim 1, wherein each unit has an adjacent unit offset in principle axis of anisotropy by less than about 20°.

11. An article as in claim 1, wherein each unit has an adjacent unit offset in principle axis of anisotropy by less than about 15°.

12. An article as in claim 1, wherein each unit has an adjacent unit offset in principle axis of anisotropy by less than about 12°.

13. An article as in claim 1, wherein each unit has an adjacent unit offset in principle axis of anisotropy by less than about 8°.

14. An article as in claim 1, wherein each unit has an adjacent unit offset in principle axis of anisotropy by less than about 6°.

15. An article as in claim 1, wherein each unit has an adjacent unit offset in principle axis of anisotropy by less than about 4°.

16. An article as in claim 1, wherein each unit has an adjacent unit offset in principle axis of anisotropy by less than about 2°.

17. An article as in claim 16, wherein the stacked array includes at least six layer units.

18. An article as in claim 12, wherein the stacked array includes at least eight layer units.

19. An article as in claim 3, wherein the stacked array includes at least ten layer units.

20. An articles as in claim 17, wherein the offset in principle axis of anisotropy of the units rotates through at least 90° through the stacked array.

21. An article as in claim 3, wherein the offset in principle axis of anisotropy of the units rotates through at least 90° through the stacked array.

22. An article as in claim 16, wherein the offset in principle axis of anisotropy of the units rotates through at least 90° through the stacked array.

23. An article as in claim 2, wherein the offset in principle axis of anisotropy of the units rotates through at least 90° through the stacked array.

24. An article as in claim 1, wherein the offset in principle axis of anisotropy of the units rotates through at least 90° through the stacked array.

25. An article as in claim 24, constructed and positioned to withstand an indentation having a component normal to a tangent of the surface of at least ⅕ the tangential force tolerable without failure of the construction.

26. An article as in claim 19, constructed and positioned to withstand an indentation having a component normal to a tangent of the surface of at least ⅕ the tangential force tolerable without failure of the construction.

27. An article as in claim 16, constructed and positioned to withstand an indentation having a component normal to a tangent of the surface of at least ⅕ the tangential force tolerable without failure of the construction.

28. An article as in claim 25, including instructions for use of the article to withstand an impact having a component normal to a tangent of the surface.

29. An article as in claim 22, including instructions for use of the article to withstand an impact having a component normal to a tangent of the surface.

30. An article as in claim 16, including instructions for use of the article to withstand indentation having a component normal to a tangent of the surface.

31. An article as in claim 1, wherein the stacked array includes at least six layer units.

32. An article as in claim 1, wherein the stacked array includes at least seven layer units.

33. An article as in claim 1, wherein the stacked array includes at least eight layer units.

34. An article as in claim 1, wherein the stacked array includes at least nine layer units.

35. An article as in claim 1, wherein the stacked array includes at least ten layer units.

36. An article as in claim 1, constructed and positioned to withstand indentation having a component normal to a tangent of the surface of at least ⅕ the tangential force tolerable without failure of the construction.

37. An article in claim 1, wherein the stacked array is constructed and positioned to withstand indentation by an indentor having a contact radius, and the layer units each have a thickness less than ⅕ the contact radius of the indentor.

38. An article in claim 30, wherein the stacked array is constructed and positioned to withstand indentation by an indentor having a contact radius, and the layer units each have a thickness less than ⅕ the contact radius of the indentor.

39. An article in claim 22, wherein the stacked array is constructed and positioned to withstand indentation by an indentor having a contact radius, and the layer units each have a thickness less than ⅕ the contact radius of the indentor.

40. An article in claim 16, wherein the stacked array is constructed and positioned to withstand indentation by an indentor having a contact radius, and the layer units each have a thickness less than ⅕ the contact radius of the indentor.

41. An article in claim 1, including instructions for use of the article to withstand indentation having a component normal to a tangent of the surface.

42. An article as in claim 1, wherein each layer unit comprises an oriented polymer having an offset in principle axis of anisotropic essentially perpendicular to a direction of orientation.

43. An article as in claim 1, each layer unit including reinforcing elements arranged to define an offset in principle axis of anisotropy, the offset in principle axis of anisotropy of each unit differing from each adjacent unit by less than 45°.

44. An article as in claim 1, wherein the construction exhibits Young's modulus at the surface of at least about 1 GPa.

45. An article as in claim 1, wherein each unit has an adjacent unit offset in principle axis of anisotropy by less than 25°, the offset in principle axis of anisotropy of each succeeding layer differing consistently in offset direction from each preceding layer and the offset in principle axis of an anisotropy of the units rotating through at least 90° through the stacked array, wherein the article is constructed and positioned to withstand indentation having a component normal to a tangent of the surface of at least 1/10 the tangential force tolerable without failure of the construction by an indentor having a potential contact radius at least five times the thickness of each layer unit.

46. An article as in claim 45, wherein the stacked array is an array of stacked fiber-reinforced polymeric plies.

47. An article as in claim 45, wherein the article is a stacked array of iron-containing reinforcing rod-supported material.

48. An article as in claim 1, wherein the construction is a vehicle support surface.

49. An article as in claim 48, wherein the construction is a road bed.

50. An article as in claim 1, wherein the construction is an aircraft runway.

51. An article as in claim 1, wherein the construction is an automobile component.

52. An article as in claim 1, wherein the construction is a ship component.

53. An article as in claim 1, wherein the construction is a bulletproof object.

54. An article as in claim 1, wherein the construction is an armor component.

55. An article as in claim 43, wherein the reinforcing elements are iron-containing reinforcing rods.

56. An article as in claim 55, each layer unit comprising iron-containing reinforcing rod-supported concrete.

* * * * *